(12) United States Patent
Otsuka et al.

(10) Patent No.: US 11,307,380 B2
(45) Date of Patent: Apr. 19, 2022

(54) LENS BARREL

(71) Applicant: FUJIFILM Corporation, Tokyo (JP)

(72) Inventors: Shinji Otsuka, Saitama (JP); Yukihiro Kaneko, Saitama (JP); Masahiko Miyata, Saitama (JP); Takeya Abe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/117,554

(22) Filed: Dec. 10, 2020

(65) Prior Publication Data

US 2021/0088748 A1 Mar. 25, 2021

Related U.S. Application Data

(63) Continuation of application No. PCT/JP2019/022367, filed on Jun. 5, 2019.

(30) Foreign Application Priority Data

Jun. 29, 2018 (JP) .............................. JP2018-124904

(51) Int. Cl.
  *G02B 7/10* (2021.01)
  *G02B 15/14* (2006.01)
  *G02B 15/16* (2006.01)

(52) U.S. Cl.
  CPC ............. *G02B 7/10* (2013.01); *G02B 15/145* (2019.08); *G02B 15/16* (2013.01)

(58) Field of Classification Search
  CPC .......................... G02B 7/10; G02B 7/02–7/021
  (Continued)

(56) References Cited

U.S. PATENT DOCUMENTS

| 5,633,763 A | * | 5/1997 | Suzuki | .................. | G02B 7/102 |
| | | | | | 359/601 |
| 6,069,745 A | * | 5/2000 | Fujii | ...................... | G02B 7/102 |
| | | | | | 359/694 |

(Continued)

FOREIGN PATENT DOCUMENTS

| CN | 102132187 A | 7/2011 |
| CN | 104423011 A | 3/2015 |

(Continued)

OTHER PUBLICATIONS

International Search Report issued in PCT/JP2019/022367; dated Sep. 3, 2019.

(Continued)

*Primary Examiner* — Zachary W Wilkes
(74) *Attorney, Agent, or Firm* — Studebaker & Brackett PC

(57) ABSTRACT

A lens barrel including a first main shaft and a first sub-shaft that guide the movement of a third front lens group (G3a), a second main shaft and a second sub-shaft that guide the movement of a fourth lens group (G4), a hall element that is used to detect the position of the third front lens group (G3a), and an MR sensor that is used to detect the position of the fourth lens group (G4) are disposed on a straight line passing through an optical axis in a cross section orthogonal to the optical axis. The first main shaft and the second main shaft overlap each other in a direction of the optical axis. In a drive unit for each lens group, a plurality of drive magnets are arranged symmetrically with respect to the straight line.

11 Claims, 10 Drawing Sheets

(58) Field of Classification Search
USPC .................................................. 359/826, 683
See application file for complete search history.

(56) References Cited

U.S. PATENT DOCUMENTS

| | | | | |
|---|---|---|---|---|
| 6,556,359 B2* | 4/2003 | Emura | ................... | G02B 7/021 |
| | | | | 359/694 |
| 6,654,182 B2* | 11/2003 | Miyakawa | ............... | G02B 7/10 |
| | | | | 359/694 |
| 7,113,351 B2* | 9/2006 | Hovanky | ............... | G02B 7/102 |
| | | | | 359/696 |
| 7,990,626 B2* | 8/2011 | Fukino | ................... | G02B 7/102 |
| | | | | 359/700 |
| 8,964,316 B2* | 2/2015 | Ohno | ........................ | G02B 7/08 |
| | | | | 359/824 |
| 9,025,257 B2* | 5/2015 | Fukino | ..................... | G02B 7/10 |
| | | | | 359/702 |
| 9,103,952 B2* | 8/2015 | Fukino | ................ | G02B 15/145 |
| 9,294,658 B2* | 3/2016 | Adachi | ................ | G02B 7/102 |
| 9,500,838 B2* | 11/2016 | Shimotsu | ............... | G02B 7/023 |
| 9,635,244 B2* | 4/2017 | Inoue | ...................... | G03B 3/10 |
| 9,900,486 B2* | 2/2018 | Moon | .................. | H04N 5/2257 |
| 10,379,314 B2* | 8/2019 | Honsho | .............. | F16C 11/0614 |
| 10,895,712 B2* | 1/2021 | Kobayashi | ............ | G03B 17/14 |
| 2004/0027476 A1 | 2/2004 | Masuda | | |
| 2004/0174614 A1 | 9/2004 | Hovanky | | |
| 2006/0139776 A1* | 6/2006 | Mori | ...................... | G02B 7/026 |
| | | | | 359/819 |
| 2010/0220403 A1* | 9/2010 | Fukino | .................. | G02B 7/102 |
| | | | | 359/823 |
| 2011/0149420 A1 | 6/2011 | Fukino | | |
| 2016/0147038 A1 | 5/2016 | Yano | | |
| 2017/0192196 A1 | 7/2017 | Kobayashi | | |
| 2019/0324226 A1* | 10/2019 | Mori | ........................ | G02B 7/04 |
| 2021/0096320 A1* | 4/2021 | Otsuka | ..................... | G02B 7/08 |

FOREIGN PATENT DOCUMENTS

| | | |
|---|---|---|
| CN | 106199894 A | 12/2016 |
| CN | 106716212 A | 5/2017 |
| JP | H08-248289 A | 9/1996 |
| JP | 2000-147350 A | 5/2000 |
| JP | 2000-314833 A | 11/2000 |
| JP | 2009-058973 A | 3/2009 |
| JP | 2013-024894 A | 2/2013 |
| JP | 2016-099523 A | 5/2016 |

OTHER PUBLICATIONS

Written Opinion issued in PCT/JP2019/022367; dated Sep. 3, 2019.
An Office Action mailed by China National Intellectual Property Administration dated Dec. 6, 2021, which corresponds to Chinese Patent Application No. 17117554.2 and is related to U.S. Appl. No. 17/117,554; with English language translation.

* cited by examiner

LENS BARREL

CROSS-REFERENCE TO RELATED APPLICATIONS

The present application is a Continuation of PCT International Application No. PCT/JP2019/022367 filed on Jun. 5, 2019 claiming priority under 35 U.S.C § 119(a) to Japanese Patent Application No. 2018-124904 filed on Jun. 29, 2018. Each of the above applications is hereby expressly incorporated by reference, in its entirety, into the present application.

BACKGROUND OF THE INVENTION

1. Field of the Invention

The present invention relates to a lens barrel, and more particularly, to a lens barrel that can independently drive a plurality of lens groups.

2. Description of the Related Art

A lens barrel that comprises a plurality of linear actuators therein to independently drive a plurality of lens groups is known.

For example, JP2000-147350A discloses a lens barrel that comprises two voice coil motors (VCMs) therein and independently drives two lens groups by the respective VCMs. The lens barrel disclosed in JP2000-147350A is adapted so that the two lens groups are supported so as to be movable along a common main shaft and a common sub-shaft.

Further, JP2016-099523A discloses a lens barrel adapted so that two lens groups are independently driven by two VCMs, are supported so as to be movable along a common sub-shaft, and are supported so as to be movable along main shafts prepared individually. In the lens barrel disclosed in JP2016-099523A, the individual main shafts are arranged on the same circumference having a center on an optical axis. That is, the individual main shafts are arranged so as to be shifted from each other in a circumferential direction.

SUMMARY OF THE INVENTION

In a case where a lens group is driven by a linear actuator, such as a VCM, it is necessary to stably support the lens group on the main shaft to accurately and smoothly move the lens group to a desired position. For this reason, it is necessary to ensure the sufficient length of a sliding portion of the lens group sliding on the main shaft (the length of a portion sliding along the main shaft).

However, a lens barrel adapted so that two lens groups are moved along a common main shaft as in JP2000-147350A has a disadvantage that the movable range of each lens group is limited, a disadvantage that the total length of the lens barrel is increased in a case where the length of the sliding portion of each lens group is increased, and the like.

On the other hand, in a case where the positions of the main shafts for each lens group are shifted from each other in the circumferential direction as in the JP2016-099523A, there is the following disadvantage. In a case where the lens group is driven by a linear actuator, such as a VCM, the position of each lens group is detected. Generally, a magnetic sensor, such as a hall element or a magneto resistive sensor (MR sensor), is used for the detection of a position. Further, the magnetic sensor is disposed at the position of the main shaft (or the sub-shaft) of which stability during movement is high. In a case where the positions of the main shafts for each lens group are shifted from each other in the circumferential direction as in the JP2016-099523A and a magnetic sensor is disposed at the position of the main shaft (or the sub-shaft), the magnetic sensor is disposed at a position asymmetric with respect to the drive magnets of the VCM for driving each lens group. Since the magnetic sensor detects a position using a magnetic field, there is a disadvantage that detection accuracy is lowered in a case where the magnetic sensor is disposed at a position asymmetric with respect to the drive magnets of the VCM.

The invention has been made in consideration of the above-mentioned circumstances, and an object of the invention is to provide a lens barrel that can stably support movable lens groups with compact configuration and accurately detect the positions of the movable lens groups.

Means for solving the above-mentioned problems are as follows.

(1) A lens barrel comprising:
  a first main shaft and a first sub-shaft that are disposed in parallel to each other with an optical axis interposed therebetween;
  a second main shaft and a second sub-shaft that are disposed in parallel to each other with the optical axis interposed therebetween;
  a first lens frame that includes a first main guide portion sliding along the first main shaft and a first sub-guide portion sliding along the first sub-shaft;
  a second lens frame that includes a second main guide portion sliding along the second main shaft and a second sub-guide portion sliding along the second sub-shaft;
  a first drive unit that includes a plurality of first drive magnets and drives the first lens frame;
  a second drive unit that includes a plurality of second drive magnets and drives the second lens frame;
  a first position detection unit that detects a position of a first position detection magnet provided on the first lens frame to detect a position of the first lens frame; and
  a second position detection unit that detects a position of a second position detection magnet provided on the second lens frame to detect a position of the second lens frame,
  wherein the first main shaft and the first sub-shaft are disposed on a straight line passing through the second main shaft and the second sub-shaft and are disposed on a radially inner side than the second main shaft and the second sub-shaft in a cross section orthogonal to the optical axis,
  the first main shaft and the second main shaft are disposed so that at least parts of the first main shaft and the second main shaft overlap each other in a direction of the optical axis,
  the first position detection unit and the second position detection unit are disposed on the straight line passing through the second main shaft and the second sub-shaft in the cross section orthogonal to the optical axis, and
  the plurality of first drive magnets and the plurality of second drive magnets are arranged symmetrically with respect to the straight line passing through the second main shaft and the second sub-shaft in the cross section orthogonal to the optical axis.

According to this aspect, the first lens frame and the second lens frame are independently driven by the first drive unit and the second drive unit. Further, positions are individually detected by the first position detection unit and the second position detection unit.

The first lens frame is supported so as to be movable along the first main shaft and the first sub-shaft, and the second lens frame is supported so as to be movable along the second main shaft and the second sub-shaft. The first main shaft and the first sub-shaft guiding the movement of the first lens frame are disposed in parallel to each other with the optical axis interposed therebetween. Further, the second main shaft and the second sub-shaft guiding the movement of the second lens frame are disposed in parallel to each other with the optical axis interposed therebetween. Accordingly, the first main shaft and the first sub-shaft guiding the movement of the first lens frame and the second main shaft and the second sub-shaft guiding the movement of the second lens frame are disposed in parallel to each other and are disposed along the optical axis. Furthermore, these shafts are disposed as follows. That is, the first main shaft and the first sub-shaft are disposed on the straight line passing through the second main shaft and the second sub-shaft and are disposed on the radially inner side than the second main shaft and the second sub-shaft in a cross section orthogonal to the optical axis. Further, the first main shaft and the second main shaft are disposed so that at least parts of the first main shaft and the second main shaft overlap each other in the direction of the optical axis. Accordingly, movable lens groups can be stably supported with compact configuration. That is, since the first main shaft and the first sub-shaft are disposed so as to be shifted from the second main shaft and the second sub-shaft in a radial direction, the lengths of the first main shaft and the second main shaft can be ensured without an increase in the size of the interchangeable lens in the direction of the optical axis as a whole. Therefore, since the lengths of the first main guide portion and the second main guide portion can be ensured, the first lens frame and the second lens frame can be stably supported.

Furthermore, the first position detection unit that detects the position of the first lens frame, the second position detection unit that detects the position of the second lens frame, the plurality of first drive magnets, and the plurality of second drive magnets are arranged as follows. That is, the first position detection unit and the second position detection unit are disposed on the straight line passing through the second main shaft and the second sub-shaft in a cross section orthogonal to the optical axis. Further, the plurality of first drive magnets and the plurality of second drive magnets are arranged symmetrically with respect to the straight line passing through the second main shaft and the second sub-shaft in a cross section orthogonal to the optical axis. Accordingly, since the first position detection unit and the second position detection unit can be disposed symmetrically with respect to the first drive magnets and the second drive magnets, the positions of the first lens frame and the second lens frame can be accurately detected.

Distinction between the main shaft and the sub-shaft is as follows. That is, a shaft, which more stably supports the lens frame, is a main shaft. Accordingly, distinction between the main shaft and the sub-shaft is determined from a relationship between the main guide portion and the sub-guide portion. A guide portion, which more stably guides the lens frame, is the main guide portion and a shaft on which the main guide portion slides is the main shaft. A guide portion of which the length in a sliding direction is longer can more stably guide the lens frame. Accordingly, a guide portion of which the length in a sliding direction is longer is the main guide portion.

(2) The lens barrel according to (1),
wherein the first position detection magnet is provided close to the first sub-guide portion, and the second position detection magnet is provided close to the second main guide portion.

According to this aspect, the first position detection magnet for the first position detection unit disposed on the inner side than the second position detection unit is provided close to the first sub-guide portion. Further, the second position detection magnet for the second position detection unit disposed on the outer side than the first position detection unit is provided close to the second main guide portion. As described above, the size of the main guide portion is larger than the size of the sub-guide portion due to the structure. Since the first position detection unit positioned on the inner side than the second position detection unit is disposed close to not the main guide portion (first main guide portion) but the sub-guide portion (first sub-guide portion), the lens barrel can be made compact in the radial direction.

(3) The lens barrel according to (2),
wherein the second position detection magnet is provided on the second main guide portion.

According to this aspect, the second position detection magnet for the second position detection unit disposed on the outer side than the first position detection unit is provided on the second main guide portion. The main guide portion is a portion that is most stably moved. Accordingly, since the second position detection magnet is provided on the main guide portion, the position of the second lens frame can be accurately detected.

(4) The lens barrel according to any one of (1) to (3),
wherein a movement stroke of the first lens frame is shorter than a movement stroke of the second lens frame.

According to this aspect, the lens frame (first lens frame) having a shorter movement stroke is guided by the main shaft (first main shaft) and the sub-shaft (first sub-shaft) disposed on the inner side. Accordingly, since the structure of a guide provided on the inner side can be made relatively small, the entire lens barrel can be made more compact.

(5) The lens barrel according to (4),
wherein the first position detection unit is formed of a hall element, and
the second position detection unit is formed of a magneto resistive sensor.

According to this aspect, the first position detection unit detecting the position of the first lens frame is formed of a hall element and the second position detection unit detecting the position of the second lens frame is formed of a magneto resistive sensor. That is, the position of the lens frame (first lens frame) having a shorter movement stroke is detected by the hall element, and the position of the lens frame (second lens frame) having a longer movement stroke is detected by the magneto resistive sensor. The first lens frame is guided by the main shaft (first main shaft) and the sub-shaft (first sub-shaft) disposed on the inner side. Accordingly, since the position of the first lens frame is detected by the hall element, the entire configuration can be made more compact.

(6) The lens barrel according to any one of (1) to (5),
wherein a weight of the first lens frame in a state where a lens is held is smaller than a weight of the second lens frame in a state where a lens is held.

According to this aspect, a lighter lens frame (first lens frame) is guided by the main shaft (first main shaft) and the sub-shaft (first sub-shaft) disposed on the inner side. Accordingly, it is possible to make the structure of a guide, which is provided on the inner side, relatively small while stably supporting each lens frame. Therefore, the entire lens barrel can be made more compact.

(7) The lens barrel according to (6),
wherein a length of the first main shaft is shorter than a length of the second main shaft.

According to this aspect, the main shaft (first main shaft) guiding a lighter lens frame (first lens frame) can be made shorter than the main shaft (second main shaft) guiding a heavier lens frame (second lens frame). Accordingly, it is possible to make the structure of a guide, which is provided on the inner side, smaller while stably supporting each lens frame. Therefore, the entire lens barrel can be made more compact.

(8) The lens barrel according to any one of (1) to (7),
wherein the first drive unit is formed of a moving magnet type voice coil motor.

According to this aspect, the first drive unit is formed of a moving magnet type voice coil motor. Accordingly, the first drive unit includes drive magnets (first drive magnets) provided on the first lens frame. Therefore, since the drive unit (first drive unit) provided on the inner side can be made relatively small, the entire lens barrel can be made more compact.

(9) The lens barrel according to any one of (1) to (8),
wherein the second drive unit is formed of a moving coil type voice coil motor.

According to this aspect, the second drive unit is formed of a moving coil type voice coil motor. Accordingly, the second drive unit includes a drive coil provided on the second lens frame. Therefore, the second lens frame can be made light. As a result, the second lens frame can be stably driven at a high speed.

(10) The lens barrel according to any one of (1) to (9), further comprising:
a first barrel that includes the first main shaft and the first sub-shaft, and holds the first lens frame;
a second barrel that includes the second main shaft and the second sub-shaft, and holds the second lens frame; and
a drive unit that moves at least one of the first barrel or the second barrel along the optical axis.

According to this aspect, the lens barrel comprises the first barrel and the second barrel that are moved relative to each other along the optical axis. The first lens frame is held by the first barrel and is moved relative to the first barrel. Further, the second lens frame is held by the second barrel and is moved relative to the second barrel. The power of the drive unit does not matter. Accordingly, the first barrel and the second barrel may be manually driven.

(11) The lens barrel according to (10),
wherein the drive unit includes a stationary barrel that includes a first straight movement groove and a second straight movement groove, a cam barrel that includes a first cam groove and a second cam groove and is fitted to the stationary barrel, a first cam pin that is provided on the first barrel and is fitted to the first straight movement groove and the first cam groove, and a second cam pin that is provided on the second barrel and is fitted to the second straight movement groove and the second cam groove; and the drive unit moves the first barrel and the second barrel along the optical axis by rotating the cam barrel relative to the stationary barrel.

According to this aspect, the drive unit is formed of a so-called cam mechanism, and the first barrel and the second barrel are moved relative to each other in a case where the cam barrel is rotated relative to the stationary barrel.

According to the invention, it is possible to stably support movable lens groups with compact configuration and to accurately detect the positions of the movable lens groups.

DESCRIPTION OF THE PREFERRED EMBODIMENTS

A preferred embodiment of the invention will be described in detail below with reference to the accompanying drawings.

Here, a case where the invention is applied to an interchangeable lens of a lens-interchangeable camera will be described by way of example.

Figure 1:
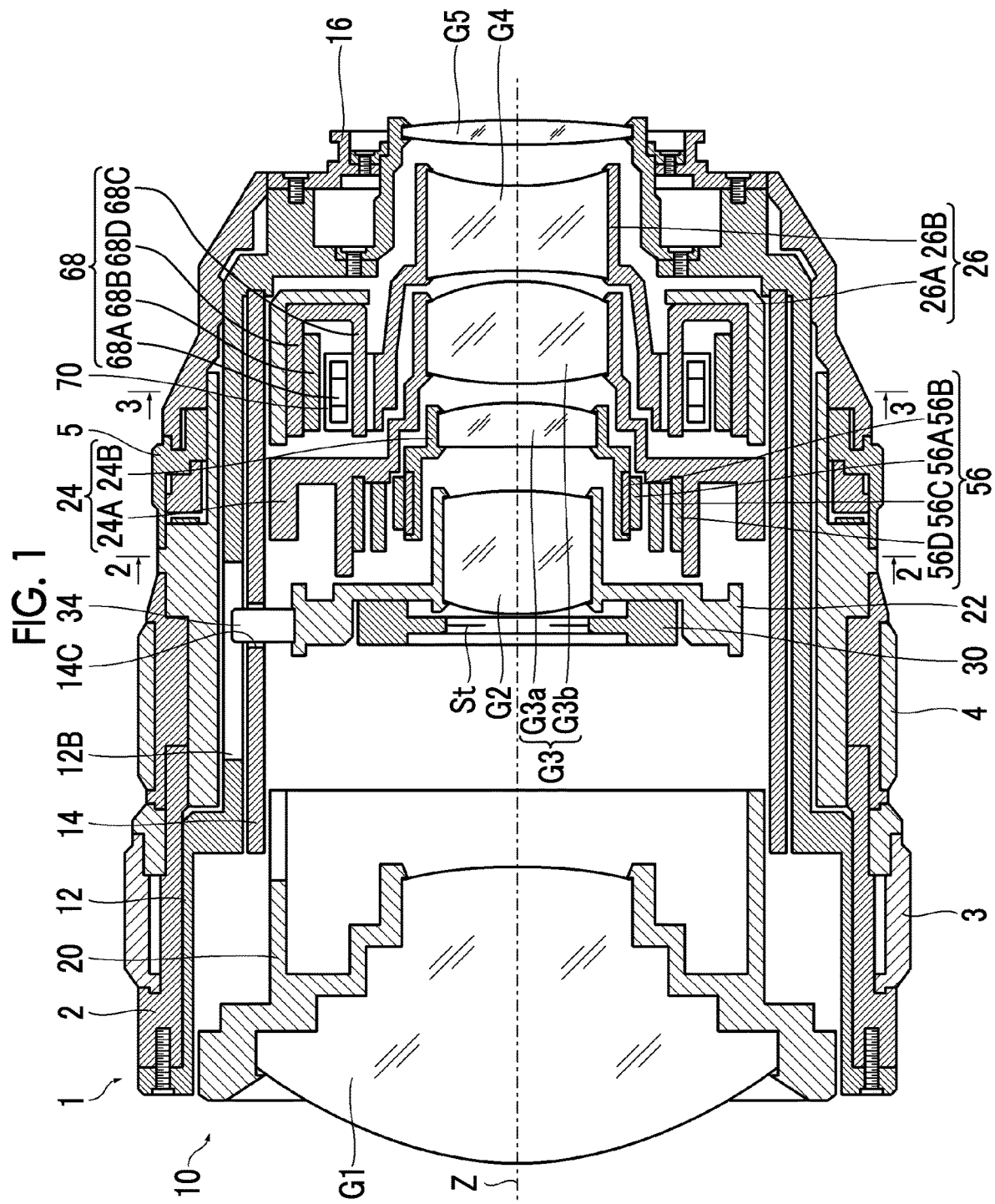
FIG. 1 is a side cross-sectional view showing an embodiment of an interchangeable lens to which the invention is applied.
Figure 2:
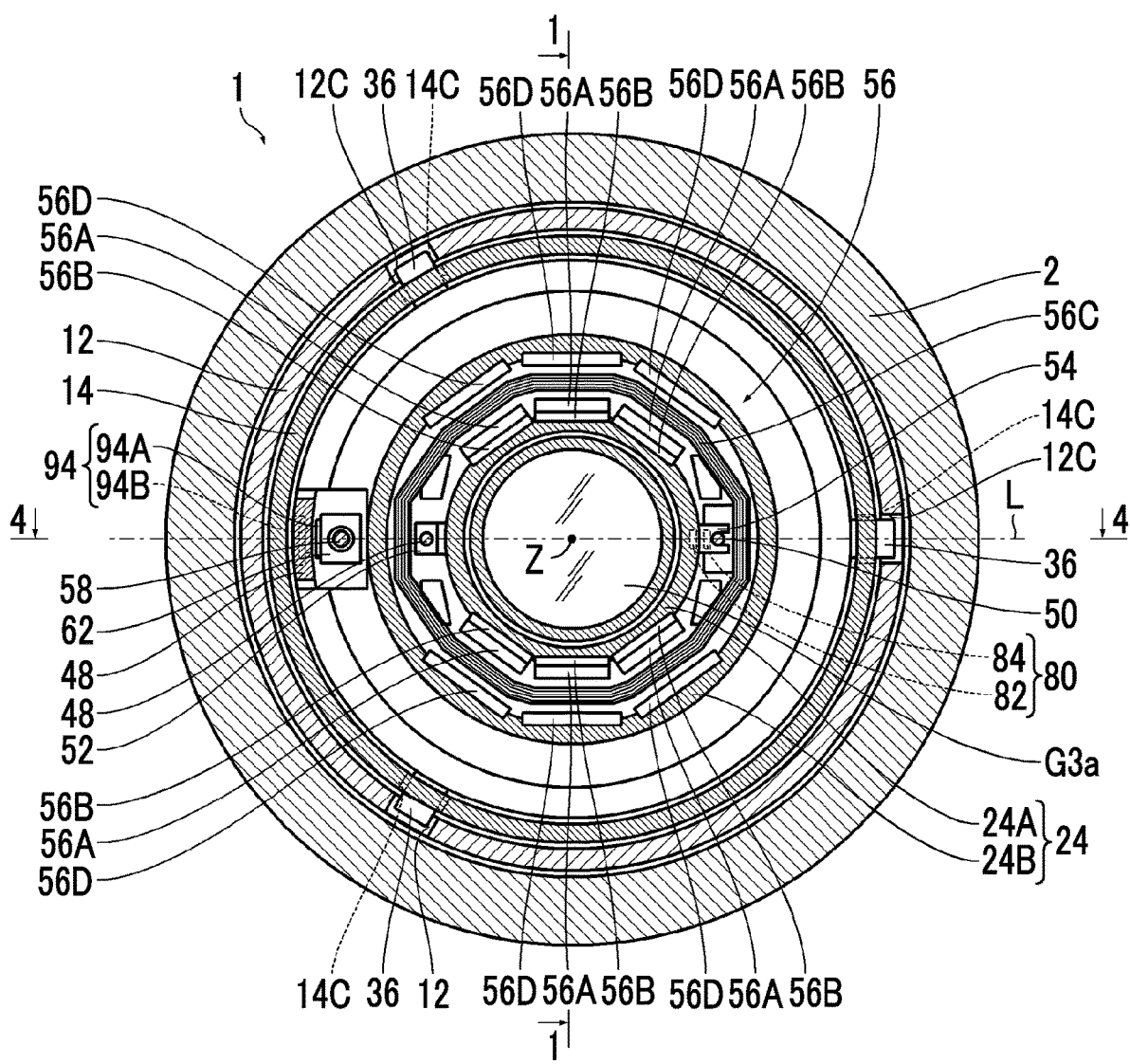
FIG. 2 is a cross-sectional view taken along line 2-2 of FIG. 1.
Figure 3:
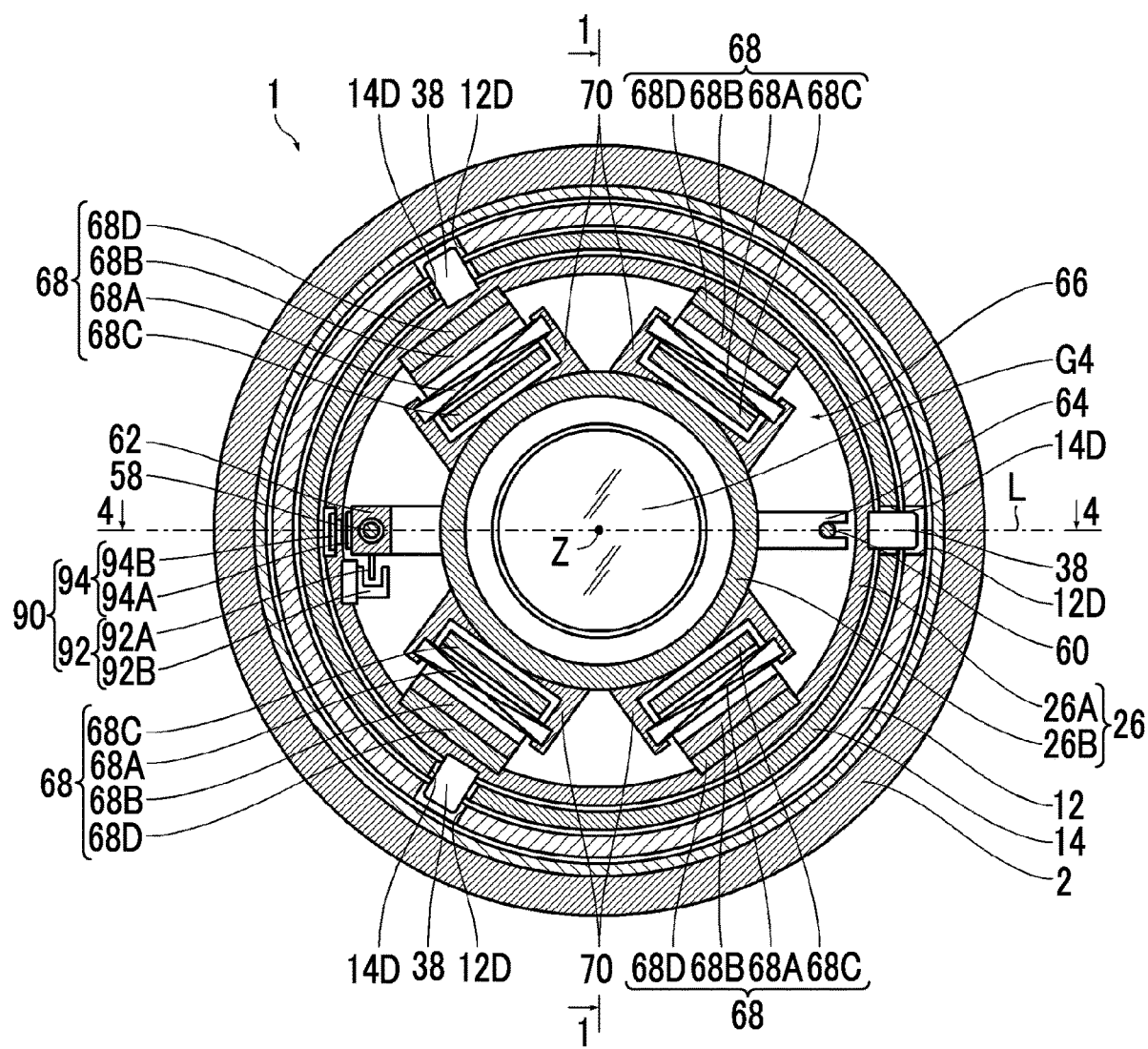
FIG. 3 is a cross-sectional view taken along line 3-3 of FIG. 1.
Figure 4:
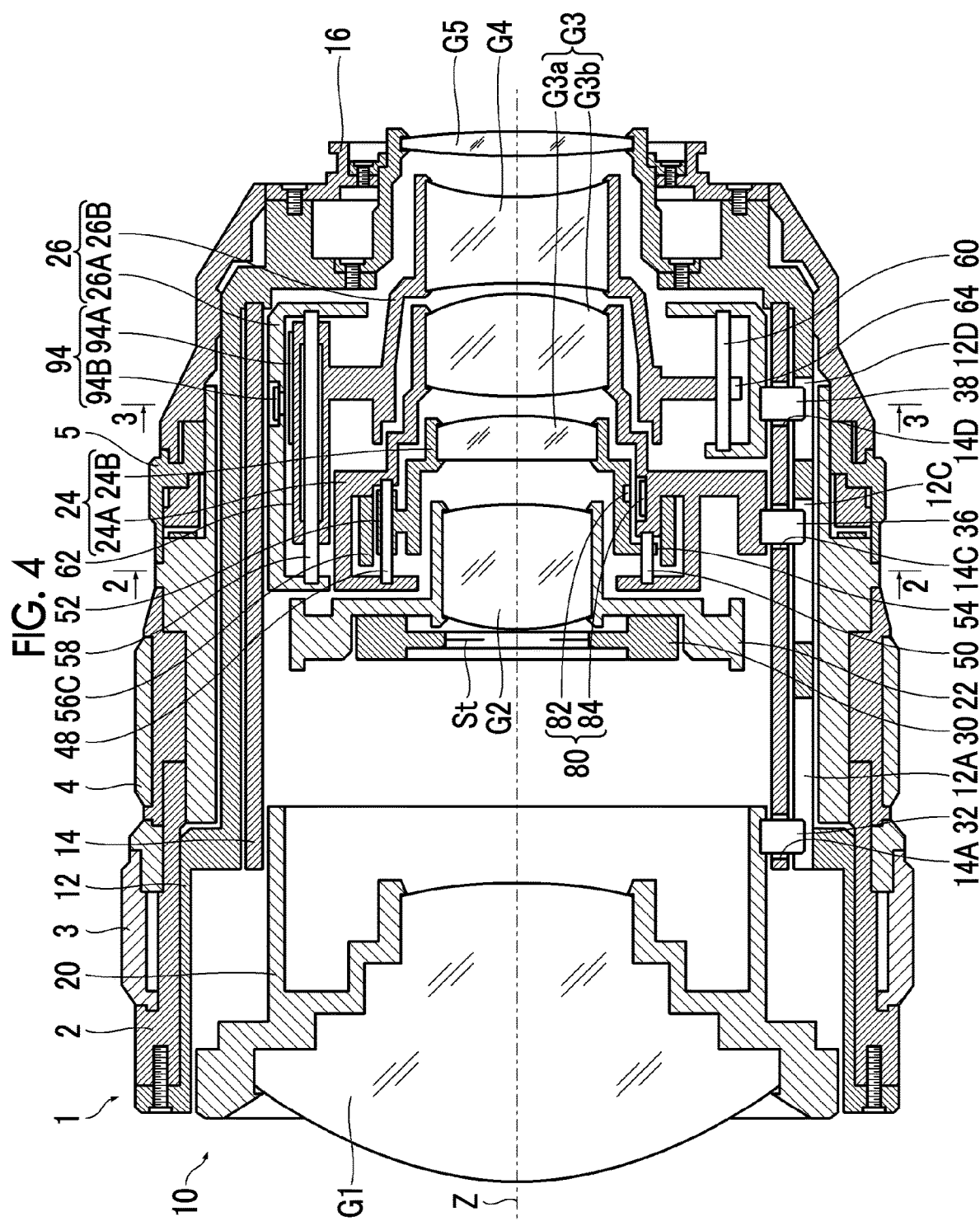
FIG. 4 is a cross-sectional view taken along line 4-4 of FIGS. 2 and 3.
Figure 5:
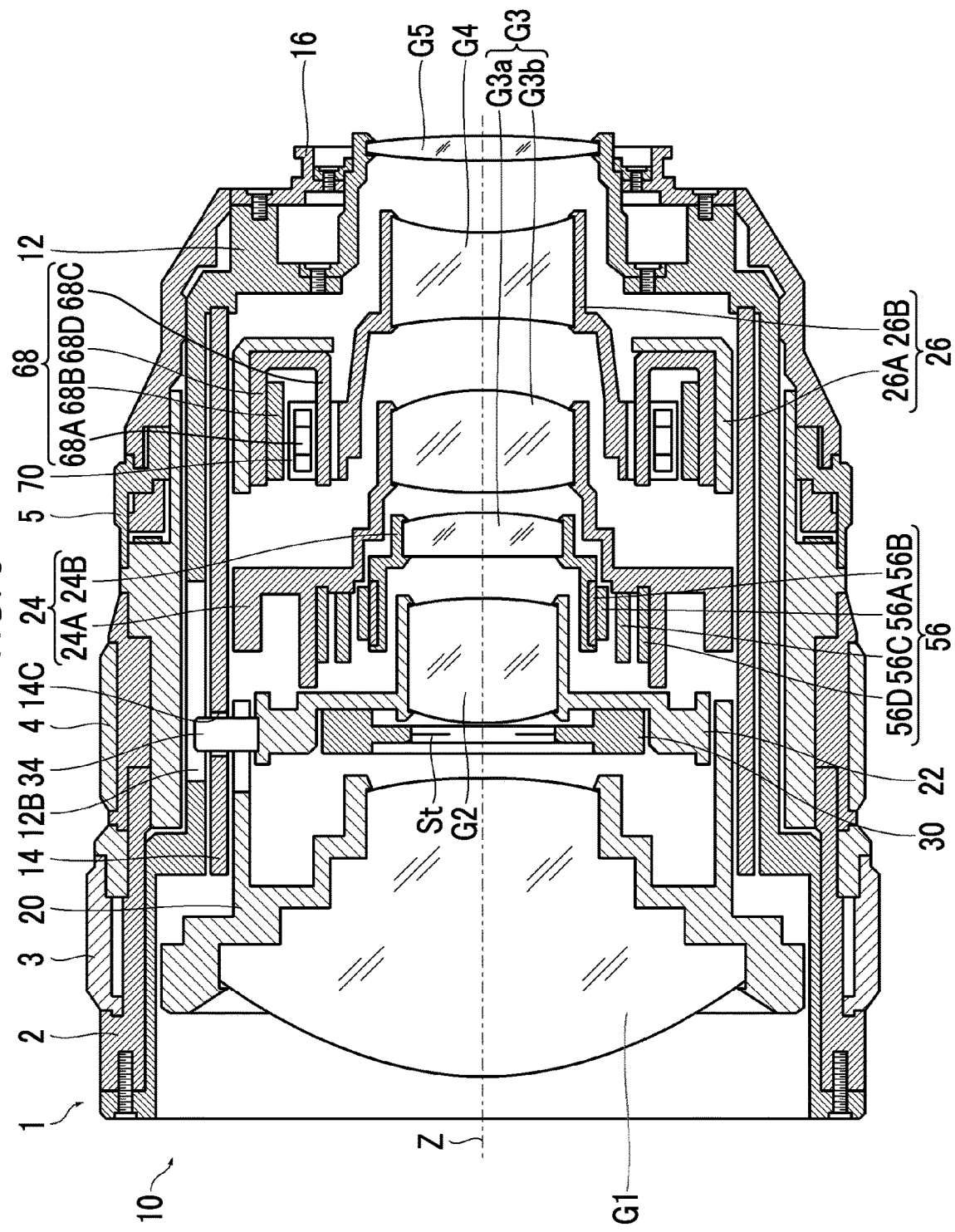
FIG. 5 is a side cross-sectional view of the interchangeable lens shown in FIG. 1 at a telephoto end.

FIG. 1 is a side cross-sectional view showing an embodiment of an interchangeable lens to which the invention is applied. FIG. 2 is a cross-sectional view taken along line 2-2 of FIG. 1. FIG. 3 is a cross-sectional view taken along line 3-3 of FIG. 1. FIG. 4 is a cross-sectional view taken along line 4-4 of FIGS. 2 and 3. FIG. 1 corresponds to a cross-sectional view taken along line 1-1 of FIGS. 2 and 3. Further, FIG. 1 is a side cross-sectional view at a wide end. FIG. 5 is a side cross-sectional view of the interchangeable lens shown in FIG. 1 at a telephoto end.

The interchangeable lens 1 of this embodiment is a so-called zoom lens, and the focal length of the interchangeable lens 1 is continuously changed by a manual zoom operation. The interchangeable lens 1 mainly includes an exterior body 2 and a lens barrel body 10 that is housed in the exterior body 2.

[Exterior Body]

The exterior body 2 has a cylindrical shape, and houses the lens barrel body 10 therein and covers the outer peripheral portion of the lens barrel body 10. The exterior body 2 is provided with a focus ring 3 that is an operation member for a focus, a zoom ring 4 that is an operation member for a zoom, and a stop ring 5 that is an operation member for a stop.

[Lens Barrel Body]

The lens barrel body 10 is an example of a lens barrel. The lens barrel body 10 includes a stationary barrel 12 and a cam barrel 14. The cam barrel 14 is fitted to the inner peripheral portion of the stationary barrel 12 and is held so as to be rotatable in a circumferential direction on the inner peripheral portion of the stationary barrel 12.

The stationary barrel 12 includes a mount 16 provided at a rear end portion thereof (an end portion thereof positioned on an image plane side). The mount 16 is formed of a so-called bayonet mount.

The cam barrel 14 is connected to the zoom ring 4 through a connecting member (not shown). Accordingly, in a case where the zoom ring 4 is rotated, the cam barrel 14 is also rotated in conjunction with the rotation of the zoom ring 4.

<<Lens Configuration>>

A plurality of lenses are arranged in the stationary barrel 12. Specifically, a first lens group G1, a second lens group G2, a third lens group G3, a fourth lens group G4, and a fifth lens group G5 are arranged in this order from an object side along an optical axis Z. Each lens group is composed of at least one lens.

Further, a stop St is disposed in the stationary barrel 12. The stop St is disposed between the first lens group G1 and the second lens group G2.

Figure 6:
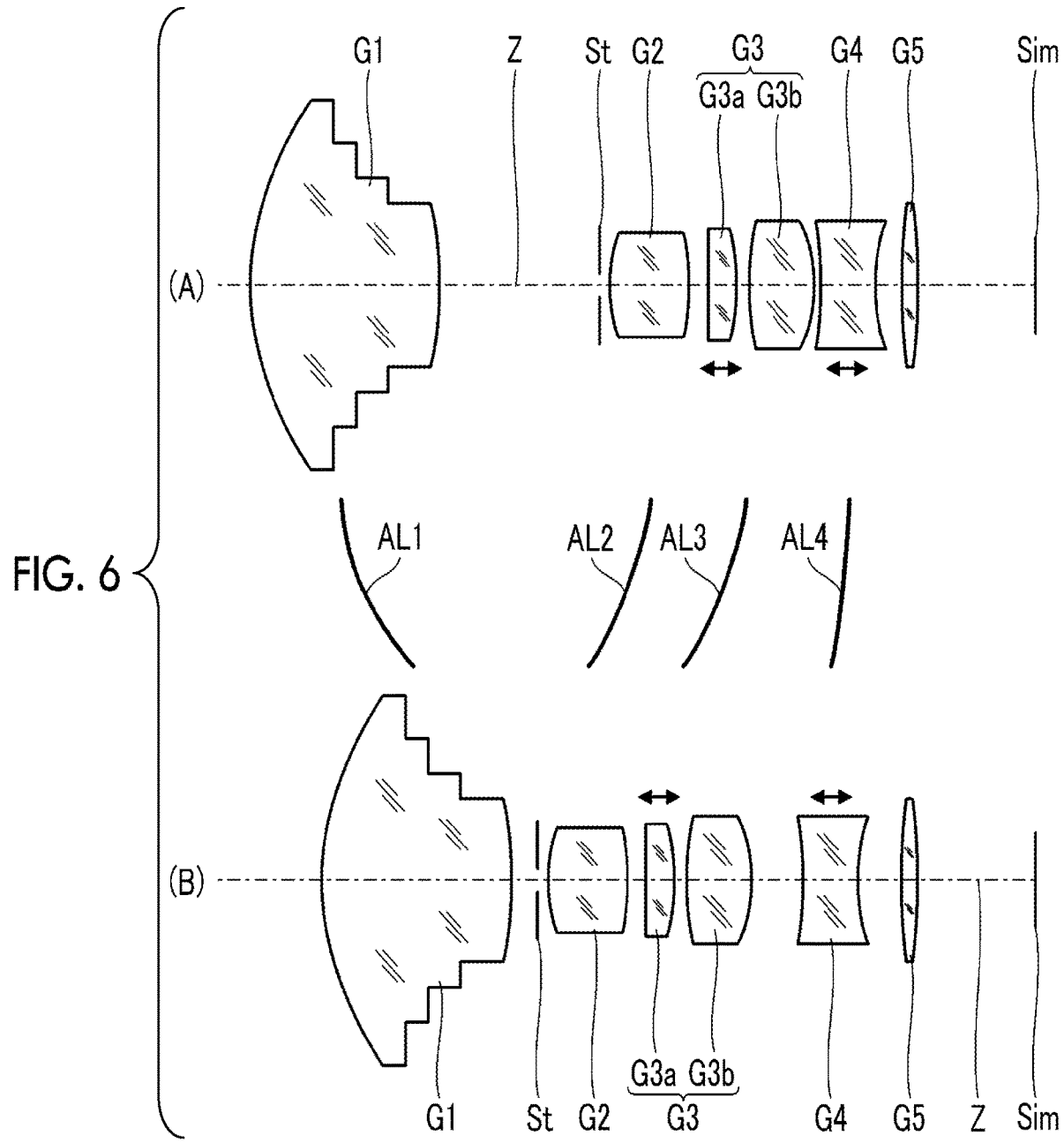
FIG. 6 is a diagram showing the movement state of each lens group in a case where a zoom operation is performed.

FIG. 6 is a diagram showing the movement state of each lens group in a case where a zoom operation is performed. In FIG. 6, part (A) shows the arrangement of lenses at a wide end, and part (B) shows the arrangement of lenses at a telephoto end.

As shown in FIG. 6, the first to fourth lens groups G1 to G4 are lens groups that are moved relative to an image plane Sim by a zoom operation. The fifth lens group G5 is a lens group that is fixed with respect to the image plane Sim by a zoom operation. The first lens group G1 is moved along a movement locus AL1 by a zoom operation, and the second lens group G2 is moved along a movement locus AL2 by a zoom operation. Further, the third lens group G3 is moved along a movement locus AL3 by a zoom operation, and the fourth lens group G4 is moved along a movement locus AL4 by a zoom operation. The stop St moves integrally with the second lens group G2.

As shown in FIG. 6, the third lens group G3 is composed of a third front lens group G3a and a third rear lens group G3b. The third front lens group G3a is a lens group for correcting field curvature. The third front lens group G3a is a lens group that is movable independently of the other lens groups. In a case where field curvature is to be corrected, the third front lens group G3a is moved along the optical axis Z.

Further, the fourth lens group G4 is a lens group for adjusting a focus. The fourth lens group G4 is a lens group that is movable independently of the other lens groups. In a case where a focus is to be adjusted, the fourth lens group G4 is moved along the optical axis Z.

<<Holding Structure for Each Lens Group>>

<First Lens Group>

As shown in FIGS. 1, 4, and 5, the first lens group G1 is held by a first lens group-holding frame 20 and is disposed in the stationary barrel 12.

The outer peripheral portion of the first lens group-holding frame 20 is provided with three first lens group-driving cam pins 32. The three first lens group-driving cam pins 32 are arranged at regular intervals in the circumferential direction. The first lens group-driving cam pins 32 are fitted to first lens group-driving cam grooves 14A provided at the cam barrel 14 and first lens group-driving straight movement grooves 12A provided at the stationary barrel 12, respectively.

The first lens group G1 is held in the stationary barrel 12 due to the above-mentioned configuration. Further, in a case where the cam barrel 14 is rotated by the zoom ring 4, the first lens group G1 is moved along the optical axis Z in the stationary barrel 12.

<Second Lens Group>

As shown in FIGS. 1, 4, and 5, the second lens group G2 is held by a second lens group-holding frame 22 and is disposed in the stationary barrel 12.

The outer peripheral portion of the second lens group-holding frame 22 is provided with three second lens group-driving cam pins 34. The three second lens group-driving cam pins 34 are arranged at regular intervals in the circumferential direction. The second lens group-driving cam pins 34 are fitted to second lens group-driving cam grooves 14B provided at the cam barrel 14 and second lens group-driving straight movement grooves 12B provided at the stationary barrel 12, respectively.

The second lens group G2 is held in the stationary barrel 12 due to the above-mentioned configuration. Further, in a case where the cam barrel 14 is rotated by the zoom ring 4, the second lens group G2 is moved along the optical axis Z in the stationary barrel 12.

As shown in FIGS. 1 and 5, a stop unit 30 forming the stop St is assembled with the second lens group-holding frame 22. Accordingly, the stop St is disposed in the stationary barrel 12 and is moved together with the second lens group G2.

<Third Lens Group>

As shown in FIGS. 1, 2, 4, and 5, the third lens group G3 is held by a third lens group-holding frame 24 and is disposed in the stationary barrel 12.

The third lens group-holding frame 24 includes a third lens group base-holding frame 24A and a third lens group-movable holding frame 24B that is held by the third lens group base-holding frame 24A. The third lens group-movable holding frame 24B is held so as to be movable along the optical axis Z in the third lens group base-holding frame 24A. The third front lens group G3a is held by the third lens group-movable holding frame 24B. The third rear lens group G3b is held by the third lens group base-holding frame 24A.

The outer peripheral portion of the third lens group base-holding frame 24A is provided with three third lens group-driving cam pins 36. The three third lens group-driving cam pins 36 are arranged at regular intervals in the circumferential direction. The third lens group-driving cam pins 36 are fitted to third lens group-driving cam grooves 14C provided at the cam barrel 14 and third lens group-driving straight movement grooves 12C provided at the stationary barrel 12, respectively. Accordingly, the third lens group base-holding frame 24A is held in the stationary barrel 12. Further, in a case where the cam barrel 14 is rotated by the zoom ring 4, the third lens group base-holding frame 24A is moved along the optical axis Z in the stationary barrel 12. The third lens group base-holding frame 24A is an example of a first barrel and the third lens group-driving cam pin 36 is an example of a first cam pin. Furthermore, the third lens group-driving cam groove 14C is an example of a first cam groove and the third lens group-driving straight movement groove 12C is an example of a first straight movement groove.

A first main shaft 48 and a first sub-shaft 50 are provided at the third lens group base-holding frame 24A. Each of the first main shaft 48 and the first sub-shaft 50 is disposed along the optical axis Z. Further, the first main shaft 48 and the first sub-shaft 50 are disposed symmetrically with respect to the optical axis Z (disposed at positions corresponding to 180° in the circumferential direction). The specific layout of the first main shaft 48 and the first sub-shaft 50 will be described in detail later.

The third lens group-movable holding frame 24B comprises a first main guide portion 52 that slides along the first main shaft 48 and a first sub-guide portion 54 that slides along the first sub-shaft 50. The third lens group-movable holding frame 24B is slidably supported by the first main shaft 48 and the first sub-shaft 50 through the first main guide portion 52 and the first sub-guide portion 54.

Figure 7:
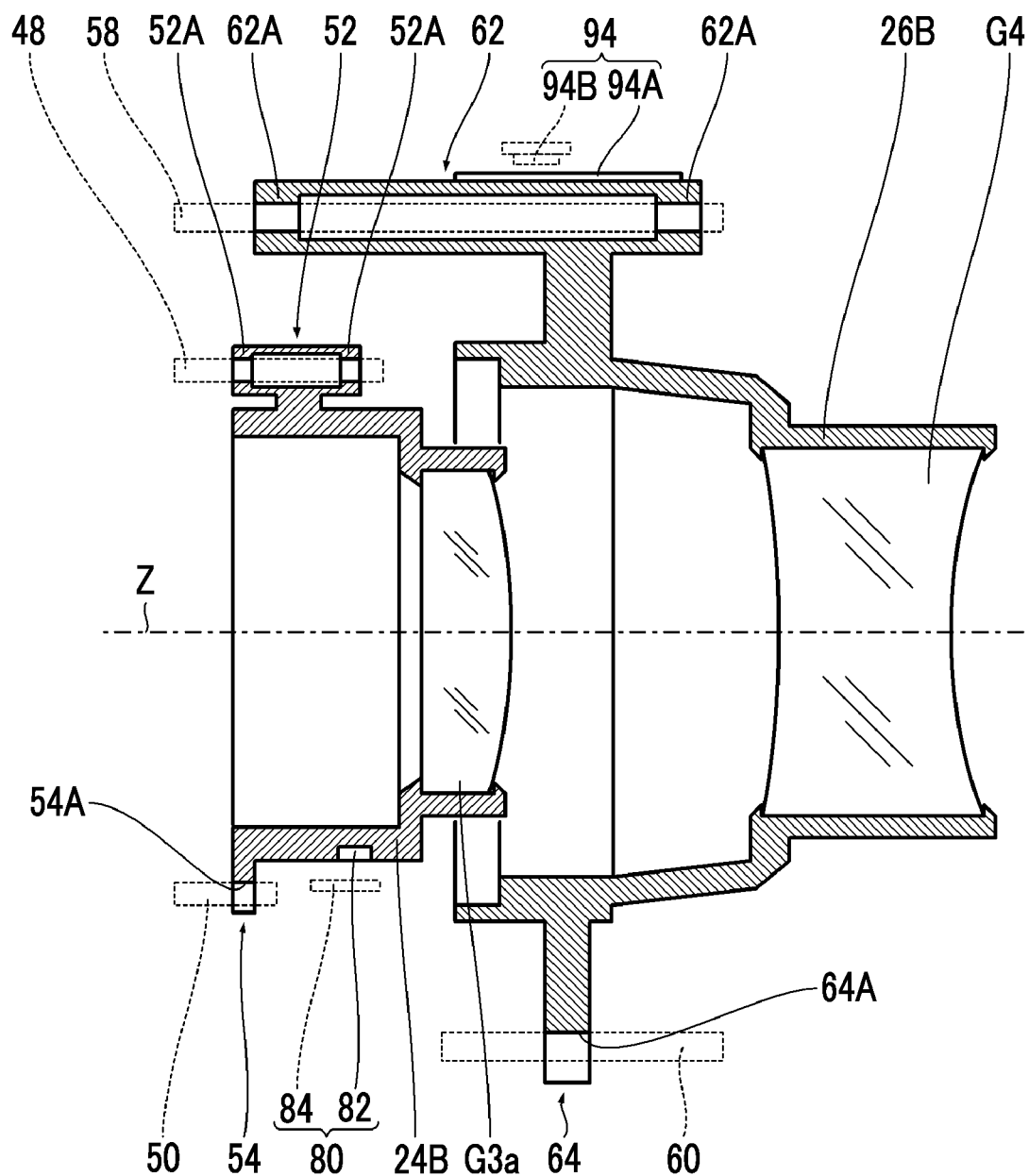
FIG. 7 is a cross-sectional view showing the support structure for a third lens group-movable holding frame and a fourth lens group-movable holding frame.

FIG. 7 is a cross-sectional view showing the support structure for the third lens group-movable holding frame and a fourth lens group-movable holding frame.

As shown in FIG. 7, the first main guide portion 52 has a tubular shape and includes sliding portions 52A provided at both ends thereof in an axial direction. The sliding portion 52A has an inner diameter corresponding to the outer diameter of the first main shaft 48. The sliding portions 52A provided at both ends of the first main guide portion 52 slide along the first main shaft 48.

The first sub-guide portion 54 includes a U-shaped groove portion 54A provided at a distal end thereof. The groove portion 54A of the first sub-guide portion 54 slides along the first sub-shaft 50.

Since the first main guide portion 52 is slidably supported by the first main shaft 48 and the first sub-guide portion 54 is slidably supported by the first sub-shaft 50, the third lens group-movable holding frame 24B is supported so as to be movable along the optical axis Z in the third lens group base-holding frame 24A. The third lens group-movable holding frame 24B is an example of a first lens frame.

The first sub-guide portion 54 is supported at one fulcrum (groove portion 54A) by the first sub-shaft 50, but the first main guide portion 52 is supported at two fulcrums (the sliding portions 52A provided at both ends) by the first main shaft 48. Accordingly, the first main guide portion 52 can support the third lens group-movable holding frame 24B more stably than the first sub-guide portion 54. The first main guide portion 52 can more stably support the third lens group-movable holding frame 24B as a distance between the two sliding portions 52A is increased. In the case of configuration where the third lens group-movable holding frame 24B is supported by a plurality of sliding portions as described above, a distance between two sliding portions positioned on the outermost side is the substantive length of a guide portion.

The third lens group-movable holding frame 24B is driven by a third front lens group-drive unit 56. The third front lens group-drive unit 56 is an example of a first drive unit. The third front lens group-drive unit 56 is formed of a moving magnet type voice coil motor (VCM). The moving magnet type VCM is a VCM of a type in which a magnet moves in a magnetic field formed by a yoke and a coil, and is one of linear actuators. The third lens group-movable holding frame 24B is provided with a plurality of drive magnets 56A and a plurality of inner yokes 56B of the moving magnet type VCM that form the third front lens group-drive unit 56. Further, the third lens group base-holding frame 24A is provided with a drive coil 56C and a plurality of outer yokes 56D of the moving magnet type VCM that forms the third front lens group-drive unit 56.

Figure 8:
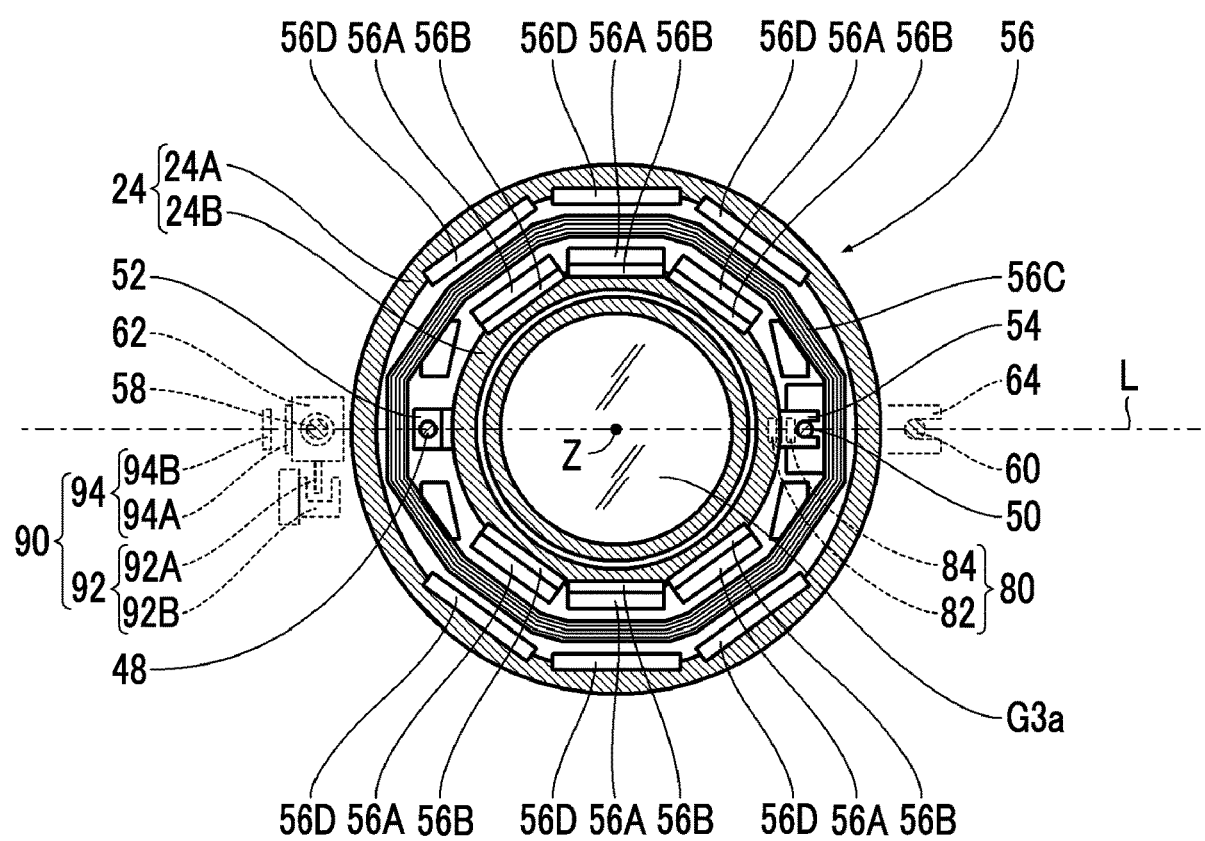
FIG. 8 is a cross-sectional view showing the mounting structure for a third front lens group-drive unit.

FIG. 8 is a cross-sectional view showing the mounting structure for the third front lens group-drive unit.

As shown in FIG. 8, the drive coil 56C is mounted so that the third lens group-movable holding frame 24B is moved along the inner peripheral portion of the drive coil 56C.

The plurality of drive magnets 56A are arranged so as to be grouped into two groups. More specifically, the two groups are disposed symmetrically with respect to the optical axis Z (disposed at an interval of 180° in the circumferential direction and disposed so as to face each other with the optical axis Z interposed therebetween). In this embodiment, six drive magnets 56A are provided and are arranged so as to be grouped into two groups. Each group includes three drive magnets 56A and the drive magnets 56A are arranged at regular intervals along the peripheral surface of the third lens group-movable holding frame 24B. The plurality of drive magnets 56A of the VCM forming the third front lens group-drive unit 56 are an example of first drive magnets.

The inner yokes 56B are provided so as to correspond to the drive magnets 56A. Each inner yoke 56B is integrated with the corresponding drive magnet 56A and is mounted on the third lens group-movable holding frame 24B.

The outer yokes 56D are provided so as to correspond to the inner yokes 56B. Each outer yoke 56D is disposed so as to face the corresponding inner yoke 56B with the drive coil 56C interposed therebetween.

The third lens group G3 is held in the stationary barrel 12 due to the above-mentioned configuration. Further, in a case where the cam barrel 14 is rotated by the zoom ring 4, the third lens group G3 is moved along the optical axis Z in the stationary barrel 12 (the third front lens group G3a and the third rear lens group G3b are integrated with each other and are moved along the optical axis Z in the stationary barrel 12). Furthermore, in a case where the third front lens group-drive unit 56 is driven, the third front lens group G3a is moved alone along the optical axis Z (the third front lens group G3a is moved independently along the optical axis Z). Since the third front lens group G3a is moved independently, field curvature is corrected.

<Fourth Lens Group>

As shown in FIGS. 1, 3, 4, and 5, the fourth lens group G4 is held by a fourth lens group-holding frame 26 and is disposed in the stationary barrel 12.

The fourth lens group-holding frame 26 includes a fourth lens group base-holding frame 26A and a fourth lens group-movable holding frame 26B that is held by the fourth lens group base-holding frame 26A. The fourth lens group-movable holding frame 26B is held so as to be movable along the optical axis Z in the fourth lens group base-holding frame 26A. The fourth lens group G4 is held by the fourth lens group-movable holding frame 26B.

The outer peripheral portion of the fourth lens group base-holding frame 26A is provided with three fourth lens group-driving cam pins 38. The three fourth lens group-driving cam pins 38 are arranged at regular intervals in the circumferential direction. The fourth lens group-driving cam pins 38 are fitted to fourth lens group-driving cam grooves 14D provided at the cam barrel 14 and fourth lens group-driving straight movement grooves 12D provided at the stationary barrel 12, respectively. Accordingly, the fourth lens group base-holding frame 26A is held in the stationary barrel 12. Further, in a case where the cam barrel 14 is rotated by the zoom ring 4, the fourth lens group base-holding frame 26A is moved along the optical axis Z in the stationary barrel 12. The fourth lens group base-holding frame 26A is an example of a second barrel and the fourth lens group-driving cam pin 38 is an example of a second cam pin. Furthermore, the fourth lens group-driving cam groove 14D is an example of a second cam groove and the fourth lens group-driving straight movement groove 12D is an example of a second straight movement groove.

A second main shaft 58 and a second sub-shaft 60 are provided at the fourth lens group base-holding frame 26A. Each of the second main shaft 58 and the second sub-shaft 60 is disposed along the optical axis Z. Further, the second main shaft 58 and the second sub-shaft 60 are disposed symmetrically with respect to the optical axis Z (disposed at positions corresponding to 180° in the circumferential direction). The specific layout of the second main shaft 58 and the second sub-shaft 60 will be described in detail later.

The fourth lens group-movable holding frame 26B comprises a second main guide portion 62 that slides along the second main shaft 58 and a second sub-guide portion 64 that slides along the second sub-shaft 60. The fourth lens group-movable holding frame 26B is slidably supported by the second main shaft 58 and the second sub-shaft 60 through the second main guide portion 62 and the second sub-guide portion 64.

As shown in FIG. 7, the second main guide portion 62 has a tubular shape and includes sliding portions 62A provided at both ends thereof in an axial direction. The sliding portion 62A has an inner diameter corresponding to the outer diameter of the second main shaft 58. The sliding portions 62A provided at both ends of the second main guide portion 62 slide along the second main shaft 58.

The second sub-guide portion 64 includes a U-shaped groove portion 64A provided at a distal end thereof. The groove portion 64A of the second sub-guide portion 64 slides along the second sub-shaft 60.

Since the second main guide portion 62 is slidably supported by the second main shaft 58 and the second sub-guide portion 64 is slidably supported by the second sub-shaft 60, the fourth lens group-movable holding frame 26B is supported so as to be movable along the optical axis Z in the fourth lens group base-holding frame 26A. The fourth lens group-movable holding frame 26B is an example of a second lens frame.

The second sub-guide portion 64 is supported at one fulcrum (groove portion 64A) by the second sub-shaft 60, but the second main guide portion 62 is supported at two fulcrums (the sliding portions 62A provided at both ends) by the second main shaft 58. Accordingly, the second main guide portion 62 can support the fourth lens group-movable holding frame 26B more stably than the second sub-guide portion 64. The second main guide portion 62 can more stably support the fourth lens group-movable holding frame 26B as a distance between the two sliding portions 62A is increased.

The fourth lens group-movable holding frame 26B is driven by a fourth lens group-drive unit 66. The fourth lens group-drive unit 66 is an example of a second drive unit. The fourth lens group-drive unit 66 is formed of a plurality of moving coil type voice coil motors (VCMs) 68. The moving coil type VCM is a VCM of a type in which only a coil moves in a magnetic field formed by a magnet, and is one of linear actuators.

Figure 9:
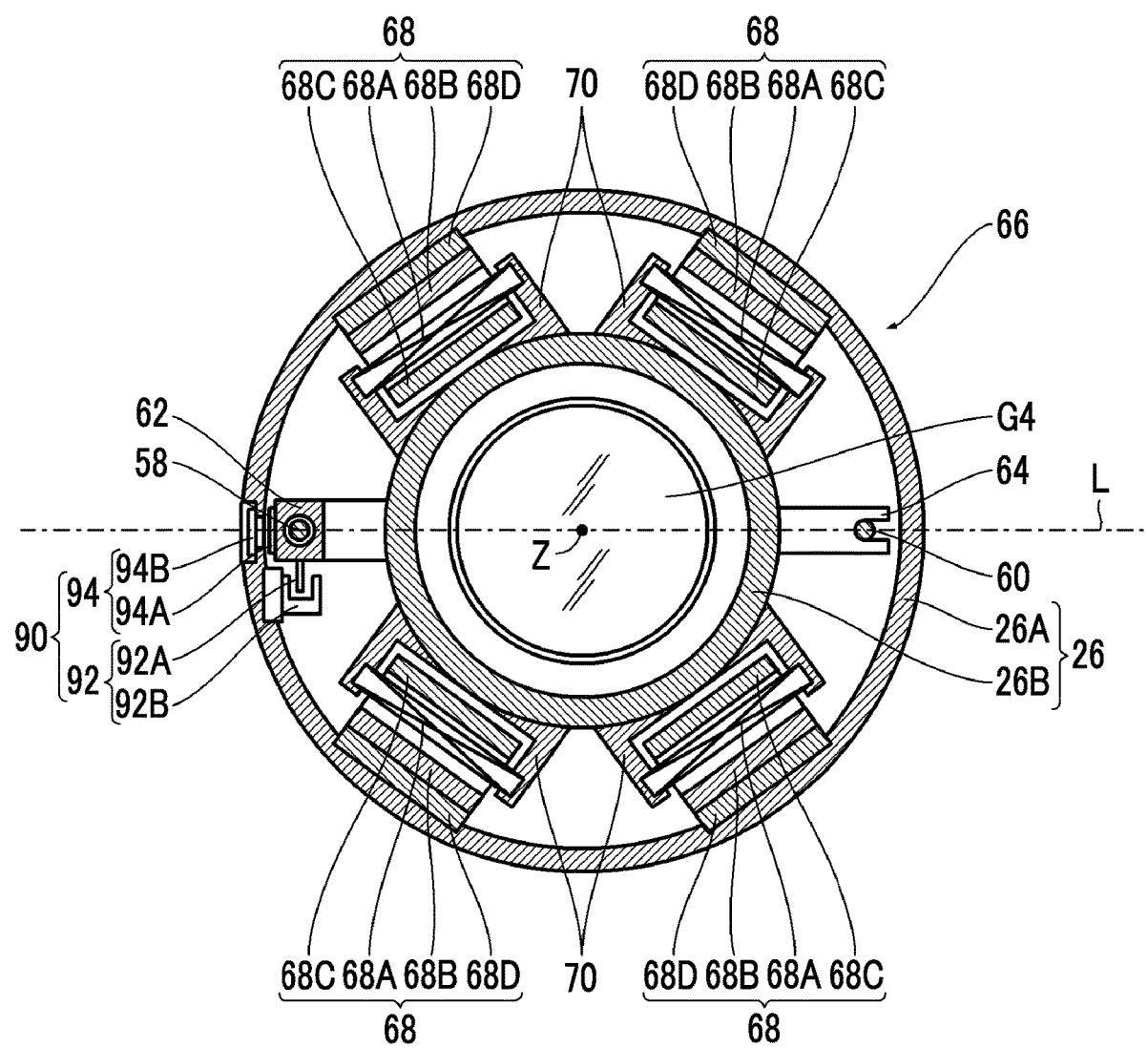
FIG. 9 is a cross-sectional view showing the mounting structure for a fourth lens group-drive unit.

FIG. 9 is a cross-sectional view showing the mounting structure for the fourth lens group-drive unit.

The plurality of VCMs 68 are arranged so as to be grouped into two groups. More specifically, the two groups are disposed symmetrically with respect to the optical axis Z (disposed at an interval of 180° in the circumferential direction and disposed so as to face each other with the optical axis Z interposed therebetween). In this embodiment, four VCMs 68 are provided and are arranged so as to be grouped into two groups. Each group includes two VCMs 68 and the VCMs 68 are arranged at a predetermined interval along the peripheral surface of the fourth lens group-movable holding frame 26B.

Each VCM 68 comprises a drive coil 68A, a drive magnet 68B, an inner yoke 68C, and an outer yoke 68D.

The drive coil 68A of each VCM 68 is mounted on the fourth lens group-movable holding frame 26B. The fourth lens group-movable holding frame 26B includes coil holding portions 70 provided on the outer peripheral portion thereof, and the drive coils 68A of the respective VCMs 68 are held by the coil holding portions 70.

The inner yoke 68C and the outer yoke 68D of each VCM 68 are disposed so as to face each other with the drive coil 68A interposed therebetween. The inner yoke 68C and the outer yoke 68D are integrated with each other. The outer yoke 68D is held by the inner peripheral portion of the fourth lens group base-holding frame 26A, so that the inner yoke 68C and the outer yoke 68D integrated with each other are disposed at predetermined positions.

The drive magnets 68B of the respective VCMs 68 are mounted inside the outer yokes 68D and are arranged at predetermined positions. The drive magnets 68B of the respective VCMs 68 are an example of a plurality of second drive magnets.

The fourth lens group G4 is held in the stationary barrel 12 due to the above-mentioned configuration. Further, in a case where the cam barrel 14 is rotated by the zoom ring 4, the fourth lens group G4 is moved along the optical axis Z in the stationary barrel 12. Furthermore, in a case where the fourth lens group-drive unit 66 is driven, the fourth lens group G4 is moved independently along the optical axis Z. Since the fourth lens group G4 is moved independently, a focus is adjusted.

<<Position Detection Mechanism for Each Lens Group>>

Each lens group is moved along a predetermined movement locus by a zoom operation (see FIG. 6). Accordingly, a relative positional relationship between the respective lens groups caused by zooming is already known.

On the other hand, the third front lens group G3*a* and the fourth lens group G4 can be moved independently of the other lens groups by the third front lens group-drive unit 56 and the fourth lens group-drive unit 66, respectively. For this reason, the positions of the third front lens group G3*a* and the fourth lens group G4 are detected separately. The position of the third front lens group G3*a* is detected by a third front lens group-position detection unit 80, and the position of the fourth lens group G4 is detected by a fourth lens group-position detection unit 90.

<Third Front Lens Group-Position Detection Unit>

The third front lens group-position detection unit 80 detects the position of the third lens group-movable holding frame 24B in the third lens group base-holding frame 24A to detect the position of the third front lens group G3*a*. More specifically, the third front lens group-position detection unit 80 detects the position of the third lens group-movable holding frame 24B with respect to a reference position set in the third lens group base-holding frame 24A to detect the position of the third front lens group G3*a* with respect to the reference position. The third front lens group-position detection unit 80 is an example of a first position detection unit.

As shown in FIGS. 4, 7, and 8, the third front lens group-position detection unit 80 includes a position detection magnet 82 that is provided on the third lens group-movable holding frame 24B, and a position detection sensor 84 that detects the position of the position detection magnet 82. Particularly, in this embodiment, the position detection sensor 84 is formed of a hall element that is a magnetic sensor.

The position detection sensor 84 is provided on the third lens group base-holding frame 24A. As shown in FIG. 8, the position detection sensor 84 is disposed at the installation position of the first sub-shaft 50 in a cross section orthogonal to the optical axis Z. More specifically, the position detection sensor 84 is disposed on a straight line passing through the optical axis Z and the first sub-shaft 50. Further, as shown in FIG. 4, the position detection sensor 84 is disposed in the rear (on the image plane side) of the first sub-shaft 50 in a cross section parallel to the optical axis Z.

The position detection magnet 82 is an example of a first position detection magnet. The position detection magnet 82 is provided on the third lens group-movable holding frame 24B. The position detection magnet 82 is disposed close to the position detection sensor 84. Specifically, as shown in FIG. 8, the position detection magnet 82 is disposed at the installation position of the first sub-guide portion 54 and is disposed so as to face the position detection sensor 84 with a predetermined gap therebetween in a cross section orthogonal to the optical axis Z. As a result, the position detection magnet 82 and the position detection sensor 84 are disposed together on the straight line passing through the optical axis Z and the first sub-shaft 50 in a cross section orthogonal to the optical axis Z.

According to the third front lens group-position detection unit 80 having the above-mentioned configuration, the position of the position detection magnet 82 provided on the third lens group-movable holding frame 24B is detected by the position detection sensor 84, so that the position of the third front lens group G3a is detected.

<Fourth Lens Group-Position Detection Unit>

The fourth lens group-position detection unit 90 detects the position of the fourth lens group-movable holding frame 26B in the fourth lens group base-holding frame 26A to detect the position of the fourth lens group G4. More specifically, the fourth lens group-position detection unit 90 detects the position of the fourth lens group-movable holding frame 26B with respect to a reference position set in the fourth lens group base-holding frame 26A to detect the position of the fourth lens group G4 with respect to the reference position. The fourth lens group-position detection unit 90 is an example of a second position detection unit.

The fourth lens group-position detection unit 90 includes a reference position detection unit 92 detecting that the fourth lens group G4 is positioned at the reference position, and a displacement detection unit 94 that detects the displacement of the fourth lens group G4. The fourth lens group-position detection unit 90 detects that the fourth lens group G4 is positioned at the reference position by the reference position detection unit 92 and detects the displacement of the fourth lens group G4 from the reference position by the displacement detection unit 94 to detect the position of the fourth lens group G4.

As shown in FIGS. 3 and 9, the reference position detection unit 92 includes a light blocking plate 92A and a photo interrupter 92B. The light blocking plate 92A is provided on the first main guide portion 52 and the photo interrupter 92B is provided on the fourth lens group base-holding frame 26A. The reference position detection unit 92 detects that the fourth lens group G4 is positioned at the reference position by detecting the light blocking plate 92A with the photo interrupter 92B. Accordingly, the light blocking plate 92A and the photo interrupter 92B are installed so that the light blocking plate 92A is detected at a timing when the fourth lens group G4 is positioned at the reference position.

As shown in FIGS. 3, 7, and 9, the displacement detection unit 94 includes a magnetic scale 94A and a magneto resistive sensor (MR sensor) 94B that detects the N poles and the S poles of the magnetic scale 94A.

The magnetic scale 94A is an example of a second position detection magnet. The magnetic scale 94A has the shape of a bar, and has a structure where N poles and S poles are arranged at a constant pitch in a longitudinal direction thereof. The magnetic scale 94A is provided on the second main guide portion 62 and is disposed along the direction of movement of the fourth lens group G4. That is, the magnetic scale 94A is disposed along the optical axis Z.

The MR sensor 94B is provided on the fourth lens group base-holding frame 26A as shown in FIGS. 3 and 9. The MR sensor 94B is disposed close to the magnetic scale 94A. More specifically, as shown in FIG. 9, the MR sensor 94B is disposed at the installation position of the second main guide portion 62 and is disposed so as to face the magnetic scale 94A with a predetermined gap therebetween in a cross section orthogonal to the optical axis Z. As a result, the magnetic scale 94A and the MR sensor 94B are disposed together on a straight line passing through the optical axis Z and the second main shaft 58 in a cross section orthogonal to the optical axis Z.

According to the fourth lens group-position detection unit 90 having the above-mentioned configuration, the light blocking plate 92A provided on the second main guide portion 62 is detected by the photo interrupter 92B, so that it is detected that the fourth lens group G4 is positioned at the reference position. Further, the displacement of the second main guide portion 62 is detected through the magnetic scale 94A by the MR sensor 94B, so that the displacement of the fourth lens group G4 is detected. The photo interrupter 92B detects that the fourth lens group G4 is positioned at the reference position and the MR sensor 94B detects the displacement of the second main guide portion 62 from the reference position, so that the position of the fourth lens group G4 with respect to the reference position is detected.

<<Layout of Drive Systems for Third Front Lens Group and Fourth Lens Group and Position Detection Unit>>

As described above, the third front lens group G3a is movably supported by the first main shaft 48 and the first sub-shaft 50 through the first main guide portion 52 and the first sub-guide portion 54. Further, the fourth lens group G4 is movably supported by the second main shaft 58 and the second sub-shaft 60 through the second main guide portion 62 and the second sub-guide portion 64. In a case where the length of the guide portion (main guide portion) with respect to the main shaft is increased in the case of configuration where a lens is supported so as to be movable along the main shaft and the sub-shaft in this way, the lens can be stably moved.

The third lens group G3 and the fourth lens group G4 are lens groups that are adjacent to each other on the optical axis Z. In a case where the first main shaft 48 and the first sub-shaft 50 guiding the movement of the third front lens group G3a and the second main shaft 58 and the second sub-shaft 60 guiding the movement of the fourth lens group G4 are arranged coaxially in this case, there is a restriction on the length of the main shaft. For this reason, the sufficient length of the guide portion cannot be ensured.

Further, in a case where the first main shaft 48 and the first sub-shaft 50 guiding the movement of the third front lens group G3a and the second main shaft 58 and the second sub-shaft 60 guiding the movement of the fourth lens group G4 are arranged so as to be shifted from each other in the circumferential direction, there is the following problem. That is, it is most preferable that the sensors (the position detection sensor 84 and the MR sensor 94B) for detecting the positions of the respective lens groups are disposed at the positions of the main shafts or the sub-shafts in terms of accuracy. However, in a case where the positions of main shafts or the sub-shafts are shifted from each other in the circumferential direction, the drive magnets of the VCMs for driving the third front lens group G3a and the fourth lens group G4 are arranged asymmetrically with respect to the sensors. As a result, there is a problem that the accuracy of a sensor detecting a position using magnetism deteriorates.

Accordingly, the drive systems and the position detection units for the third front lens group G3a and the fourth lens group G4 are laid out in the interchangeable lens 1 of this embodiment as follows.

As shown in FIG. 2, the second main shaft 58 and the second sub-shaft 60 guiding the movement of the fourth lens group G4 are disposed on a straight line L passing through the optical axis Z in a cross section orthogonal to the optical axis Z. Accordingly, the second main shaft 58 and the second sub-shaft 60 are disposed in parallel to each other with the optical axis Z interposed therebetween. "On the straight line" mentioned here includes a case where it is recognized that the centers of the respective shafts are positioned substantially on the same straight line in addition to a case where the centers of the respective shafts are positioned on completely the same straight line. That is, "on the straight line" mentioned here includes a case where the centers of the respective shafts are positioned substantially on the same straight line.

Further, as shown in FIG. 2, the first main shaft 48 and the first sub-shaft 50 guiding the movement of the third front lens group G3a are disposed on the straight line L (a straight line passing through the optical axis Z and passing through the second main shaft 58 and the second sub-shaft 60) in a cross section orthogonal to the optical axis Z. Accordingly, the first main shaft 48 and the first sub-shaft 50 are disposed in parallel to each other with the optical axis Z interposed therebetween. "On the straight line" mentioned here includes a case where it is recognized that the centers of the respective shafts are positioned substantially on the same straight line in addition to a case where the centers of the respective shafts are positioned on completely the same straight line. That is, "on the straight line" mentioned here includes a case where the centers of the respective shafts are positioned substantially on the same straight line.

Furthermore, the first main shaft 48 and the first sub-shaft 50 are disposed on the radially inner side than the second main shaft 58 and the second sub-shaft 60 in a cross section orthogonal to the optical axis Z as shown in FIG. 2, and the first main shaft 48 and the second main shaft 58 are disposed so as to overlap each other as shown in FIG. 4. Accordingly, the first main shaft 48, the second main shaft 58, the first sub-shaft 50, and the second sub-shaft 60 are disposed on the same straight line L in a cross section orthogonal to the optical axis Z.

Since one main shaft and one sub-shaft are disposed so as to be shifted to the radially inner side from the other main shaft and the other sub-shaft in a cross section orthogonal to the optical axis Z in this way, the lengths of both the main shafts can be increased. Accordingly, since the lengths of both the main guide portions can be ensured, the lens to be guided by each shaft can be stably moved.

As described above, the position detection sensor 84 for detecting the position of the third front lens group G3a is disposed on at the installation position of the first sub-shaft 50 and is disposed on the straight line L. Further, the MR sensor 94B used to detect the position of the fourth lens group G4 is disposed on at the installation position of the second main guide portion 62 and is disposed on the straight line L. "On the straight line" mentioned here includes a range where it is recognized that the sensor is disposed substantially on the straight line. That is, "on the straight line" mentioned here includes a case where the sensor is disposed substantially on the straight line L.

Furthermore, as described above, the third front lens group-drive unit 56 for driving the third front lens group G3a is formed of a VCM and the plurality of drive magnets 56A (first drive magnets) forming the VCM are arranged symmetrically with respect to the optical axis Z. Particularly, in the interchangeable lens 1 of this embodiment, as shown in FIG. 2, the plurality of drive magnets 56A are arranged symmetrically with respect to the straight line L (a straight line passing through the optical axis Z and passing through the first main shaft 48, the second main shaft 58, the first sub-shaft 50, and the second sub-shaft 60) in a cross section orthogonal to the optical axis Z. "Symmetrically" mentioned here includes a range where it is recognized that the plurality of drive magnets are arranged substantially symmetrically in addition to a range where the plurality of drive magnets are arranged completely symmetrically. That is, "symmetrically" mentioned here includes a case where the plurality of drive magnets are arranged substantially symmetrically.

Further, as described above, the fourth lens group-drive unit 66 for driving the fourth lens group G4 is formed of the plurality of VCMs 68 and the plurality of drive magnets 68B (second drive magnets) forming the plurality of VCMs 68 are arranged symmetrically with respect to the optical axis Z. Particularly, in the interchangeable lens 1 of this embodiment, as shown in FIG. 3, the plurality of drive magnets 68B are arranged symmetrically with respect to the straight line L (a straight line passing through the optical axis Z and passing through the first main shaft 48, the second main shaft 58, the first sub-shaft 50, and the second sub-shaft 60) in a cross section orthogonal to the optical axis Z. "Symmetrically" mentioned here includes a range where it is recognized that the plurality of drive magnets are arranged substantially symmetrically in addition to a range where the plurality of drive magnets are arranged completely symmetrically. That is, "symmetrically" mentioned here includes a case where the plurality of drive magnets are arranged substantially symmetrically.

Since the drive magnets of each lens group are arranged symmetrically with respect to the straight line L in a cross section orthogonal to the optical axis Z in this way, the drive magnets of each lens group can be arranged symmetrically with respect to the position detection sensor 84 and the MR sensor 94B disposed on the straight line L. Accordingly, even in a case where the position detection sensor (hall element) 84, which is a magnetic sensor, and the MR sensor 94B are installed at the positions of the main shafts or the sub-shafts, the positions of the lens groups can be accurately detected.

As described above, according to the interchangeable lens 1 of this embodiment, the first main shaft 48, the first sub-shaft 50, the second main shaft 58, and the second sub-shaft 60 are disposed on the straight line L passing through the optical axis Z and the first main shaft 48 and the first sub-shaft 50 are disposed on the radially inner side than the second main shaft 58 and the second sub-shaft 60.

Accordingly, the movable lens groups can be stably supported with compact configuration. That is, since the first main shaft 48 and the first sub-shaft 50 are disposed so as to be shifted from the second main shaft 58 and the second sub-shaft 60 in a radial direction, the lengths of the first main shaft 48 and the second main shaft 58 can be ensured without an increase in the size of the interchangeable lens in the direction of the optical axis as a whole. Therefore, since the lengths of the first main guide portion 52 and the second main guide portion 62 can be ensured, the third front lens group G3a and the fourth lens group G4 can be stably supported.

Further, the drive magnets driving each lens group are arranged symmetrically with respect to the straight line L, which passes through the optical axis Z, in a cross section orthogonal to the optical axis Z. Accordingly, even in a case where the position detection sensor (hall element) 84, which is a magnetic sensor, and the MR sensor 94B are installed at the positions of the main shafts or the sub-shafts, the positions of the lens groups can be accurately detected.

That is, according to the interchangeable lens 1 of this embodiment, it is possible to stably support the movable lens groups (the third front lens group G3a and the fourth lens group G4) and to accurately detect the positions of the movable lens groups while making the entire interchangeable lens compact.

[Electric Configuration of Interchangeable Lens]

Figure 10:
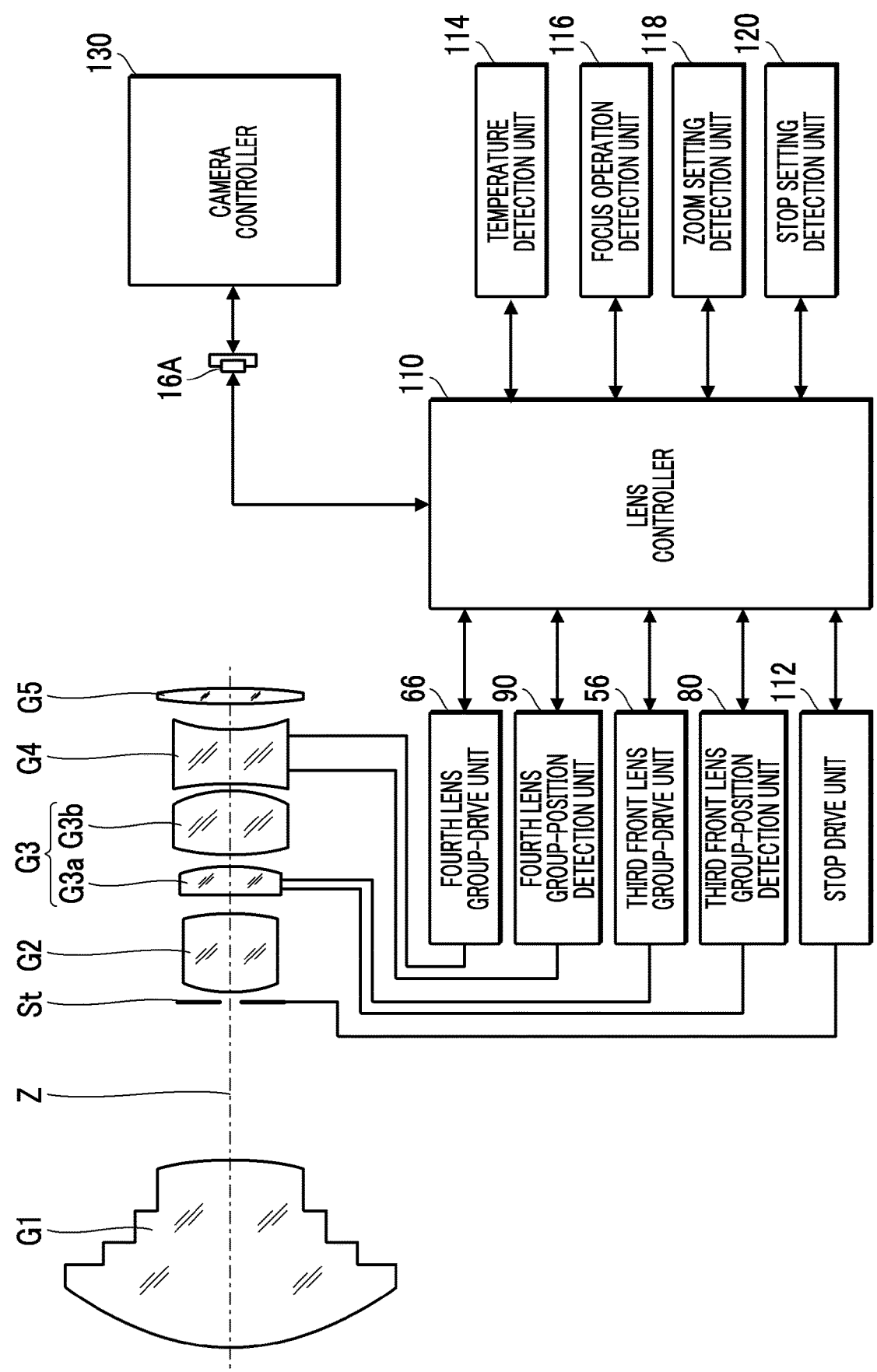
FIG. 10 is a block diagram showing the electric configuration of the interchangeable lens.

FIG. 10 is a block diagram showing the electric configuration of the interchangeable lens.

The interchangeable lens 1 comprises the third front lens group-drive unit 56 that drives the third front lens group G3a, the third front lens group-position detection unit 80 that detects the position of the third front lens group G3a, the fourth lens group-drive unit 66 that drives the fourth lens group G4, the fourth lens group-position detection unit 90 that detects the position of the fourth lens group G4, a stop drive unit 112 that drives the stop St, a temperature detection unit 114 that detects a temperature inside the interchangeable lens 1, a focus operation detection unit 116 that detects a focus operation, a zoom setting detection unit 118 that detects a zoom operation, a stop setting detection unit 120 that detects a stop operation, and a lens controller 110 that controls the action of the entire interchangeable lens 1 overall.

The third front lens group-drive unit 56 moves the third front lens group G3a along the optical axis Z according to a command from the lens controller 110.

The third front lens group-position detection unit 80 detects the position of the third front lens group G3a and outputs a detection result thereof to the lens controller 110.

The fourth lens group-drive unit 66 moves the fourth lens group G4 along the optical axis Z according to a command from the lens controller 110.

The fourth lens group-position detection unit 90 includes the reference position detection unit 92 and the displacement detection unit 94 as described above. The reference position detection unit 92 detects that the fourth lens group G4 is positioned at the reference position. Further, the displacement detection unit 94 detects the displacement of the fourth lens group G4. The fourth lens group-position detection unit 90 detects that the fourth lens group G4 is positioned at the reference position by the reference position detection unit 92 and detects the displacement of the fourth lens group G4 from the reference position by the displacement detection unit 94, so that the position of the fourth lens group G4 is detected.

The stop drive unit 112 is formed of an actuator, such as a motor, and is included in the stop unit 30. The stop drive unit 112 increases or reduces the size of the aperture of the stop St according to a command from the lens controller 110.

The temperature detection unit 114 detects a temperature inside the interchangeable lens 1, and outputs a detection result thereof to the lens controller 110. The temperature detection unit 114 is included in, for example, the stop unit 30.

The focus operation detection unit 116 detects the rotation angle of the focus ring 3, and outputs a detection result thereof to the lens controller 110. The lens controller 110 detects the amount of adjustment of a focus on the basis of the output from the focus operation detection unit 116.

The zoom setting detection unit 118 detects the set position of the zoom ring 4 and outputs a detection result thereof to the lens controller 110. The lens controller 110 detects the set value (focal length) of a zoom on the basis of the output from the zoom setting detection unit 118.

The stop setting detection unit 120 detects the set position of the stop ring 5 and outputs a detection result thereof to the lens controller 110. The lens controller 110 detects the set value (F number) of the stop on the basis of the output from the stop setting detection unit 120.

The lens controller 110 controls the actions of the respective parts on the basis of the operations of the focus ring 3, the zoom ring 4, and the stop ring 5. Specifically, in a case where a manual focus is set, the lens controller 110 drives the fourth lens group-drive unit 66 on the basis of the rotation angle of the focus ring 3 and causes the fourth lens group G4 to be moved. Further, the lens controller 110 drives the third front lens group-drive unit 56 and the fourth lens group-drive unit 66 on the basis of the setting of the zoom ring 4 and causes the third front lens group G3a and the fourth lens group G4 to be moved to predetermined positions. Accordingly, field curvature based on a zoom position is corrected. Furthermore, the lens controller 110 drives the stop drive unit 112 on the basis of the setting of the stop ring 5 and sets the stop St to a predetermined aperture value (F number).

Further, the lens controller 110 controls the action of each part according to a command from a camera on which the interchangeable lens 1 is mounted. For example, the lens controller 110 drives the fourth lens group-drive unit 66 on the basis of auto-focus information from the camera, and causes the fourth lens group G4 to be moved to a predetermined position. Furthermore, the lens controller 110 drives the stop drive unit 112 on the basis of stop setting information from the camera and sets the stop St to a predetermined aperture value.

The lens controller 110 communicates with a camera controller 130 of the camera and receives a drive command for each part from the camera controller 130. Further, the lens controller 110 transmits zoom setting information, stop setting information, focus position information, and the like to the camera controller 130. Communication between the lens controller 110 and the camera controller 130 is performed through a terminal 16A that is provided on the mount 16.

Furthermore, the lens controller 110 drives the third front lens group-drive unit 56 on the basis of the temperature detected by the temperature detection unit 114 and causes the third front lens group G3a to be moved to a predetermined position. Accordingly, field curvature based on a change in temperature is corrected.

The lens controller 110 is formed of, for example, a computer that comprises a central processing unit (CPU), a read only memory (ROM), and a random access memory (RAM), and achieves various control functions and the like by executing predetermined programs.

Modification Examples

<<Configuration of Position Detection Unit for Each Lens Group>>

The position of the third front lens group G3a is detected by a hall element in the embodiment, but configuration where the position of the third front lens group G3a is detected is not limited thereto. The third front lens group G3a may be detected using a combination of a photo interrupter and an MR sensor as with the fourth lens group G4.

Further, the position of the fourth lens group G4 is detected using a combination of a photo interrupter and an MR sensor in the embodiment, but configuration where the position of the fourth lens group G4 is detected is not limited thereto. The position of the fourth lens group G4 may be detected by a hall element as with the third front lens group G3a.

It is preferable that a sensor to be used is selected in consideration of the movement stroke of a lens. For example, it is preferable that the position of a lens group of which the movement stroke is relatively short is detected using a hall element and the position of a lens group of which the movement stroke is relatively long is detected using an MR sensor. Since a hall element can detect an absolute position (a position based on a predetermined reference position), the configuration of the position detection unit can be made compact.

In the interchangeable lens 1 of the embodiment, the movement stroke of the third front lens group G3a is set to be shorter than the movement stroke of the fourth lens group G4. For this reason, the position of the third front lens group G3a is adapted to be detected by the hall element and the position of the fourth lens group G4 is adapted to be detected by the MR sensor. Since the position of the third front lens group G3a for which the main shaft and the sub-shaft serving as guide shafts are disposed on the radially inner side is adapted to be detected by the hall element, the entire configuration can be made compact.

<<Layout of Position Detection Unit for Each Lens Group>>

Configuration where the position detection unit is disposed close to the sub-shaft is described in the embodiment as configuration where the position of the third front lens group G3a is detected, but the position detection unit may be disposed close to the main shaft. For example, the position detection magnet may be disposed at the first main guide portion 52 and the position of the position detection magnet may be detected by a hall element. Accordingly, since a position can be detected using the main guide portion that allows more stable movement, a position can be detected with a higher accuracy.

In a case where the position detection magnet 82 is disposed close to the first sub-guide portion 54 as in the embodiment, an empty space (a space behind the first sub-guide portion 54) can be effectively used to dispose the position detection unit. Accordingly, the entire configuration can be made compact.

Likewise, configuration where the position detection unit is disposed close to the sub-shaft may be employed as configuration where the position of the fourth lens group G4 is detected. For example, in a case where the movement stroke of the fourth lens group G4 is short, configuration where the position detection unit is disposed close to the sub-shaft may be employed as configuration where the position of the fourth lens group G4 is detected by a hall element as in the case of the third front lens group G3a.

In a case where the position of the fourth lens group G4 is detected using the MR sensor 94B as in the embodiment, the magnetic scale 94A can be provided on the second main guide portion 62 to detect the position of the fourth lens group G4 with a high accuracy. That is, since the second main guide portion 62 is a portion of which the movement is most stable, the magnetic scale 94A can be stably moved in a case where the magnetic scale 94A is provided on this portion. Accordingly, a position can be detected with a high accuracy.

<<Layout of Main Shaft and Sub-Shaft for Each Lens Group>>

The positions of the first main shaft 48 and the first sub-shaft 50 guiding the movement of the third front lens group G3a and the positions of the second main shaft 58 and the second sub-shaft 60 guiding the movement of the fourth lens group G4 are provided in the embodiment, but the positional relationship between the main shafts and the sub-shafts may be reversed. For example, the main shafts for the third front lens group G3a and the fourth lens group G4 are disposed on the upper side and the sub-shafts therefor are disposed on the lower side in FIG. 4 in the embodiment, but the main shaft for the third front lens group G3a and the sub-shaft for the fourth lens group G4 may be disposed on the upper side and the sub-shaft for the third front lens group G3a and the main shaft for the fourth lens group G4 may be disposed on the lower side.

<<Relationship Between Inside and Outside>>

The main shaft and the sub-shaft for the lens group positioned on the front side in the direction of the optical axis (third front lens group G3a) are disposed on the radially inner side of the main shaft and the sub-shaft for the lens group positioned on the rear side (fourth lens group G4) in the embodiment, but the main shaft and the sub-shaft for the lens group positioned on the rear side may be disposed on the radially inner side of the main shaft and the sub-shaft for the lens group positioned on the front side. It is preferable that the main shaft and the sub-shaft for the lens group to be disposed on the radially inner side are determined in consideration of the movement stroke, weight, and the like of each lens group.

For example, with regard to a movement stroke, it is preferable that the main shaft and the sub-shaft for a lens group having a shorter stroke are disposed on the radially inner side. Accordingly, since the structure of a guide provided on the inner side can be made relatively small, the entire lens barrel can be made more compact. Since the movement stroke of the third front lens group G3a is set to be shorter than the movement stroke of the fourth lens group G4 in the interchangeable lens 1 of the embodiment, the main shaft and the sub-shaft for the third front lens group G3a are disposed on the radially inner side of the main shaft and the sub-shaft for the fourth lens group G4. Accordingly, the structure of a guide for the third front lens group G3a disposed on the inner side can be made relatively small.

Further, with regard to weight, it is preferable that the main shaft and the sub-shaft for a lighter lens group are disposed on the radially inner side. Weight mentioned here is the weight of the movable holding frames (the third lens group-movable holding frame 24B and the fourth lens group-movable holding frame 26B) in a state where the lenses are held. Since the main shaft and the sub-shaft for a lighter lens group are disposed on the radially inner side, the structure of a guide provided on the inner side can be made relatively small. Accordingly, the entire configuration can be made compact. Since the third front lens group G3a is lighter than the fourth lens group G4 in the interchangeable lens 1 of the embodiment, the main shaft and the sub-shaft for the third front lens group G3a are disposed on the radially inner side of the main shaft and the sub-shaft for the fourth lens group G4. Accordingly, the structure of a guide for the third front lens group G3a disposed on the inner side can be made relatively small.

Furthermore, in a case where the main shaft and the sub-shaft for a lighter lens group are disposed on the radially inner side, it is preferable that the length of the main shaft disposed on the inner side is set to be shorter than the length of the main shaft disposed on the outer side. Accordingly, the structure of a guide provided on the inner side can be made more compact.

<<Drive Unit>>

The third front lens group-drive unit 56 is formed of a moving magnet type VCM in the embodiment, but may be formed of a moving coil type VCM. Further, the fourth lens group-drive unit 66 is formed of moving coil type VCMs in the embodiment, but may be formed of moving magnet type VCMs.

In a case where the third front lens group G3a is adapted to be driven by a moving magnet type VCM as in the embodiment, the drive unit for the third front lens group G3a can be made small. This works particularly effectively in the case of configuration where the main shaft and the sub-shaft for the third front lens group G3a are disposed on the radially inner side as in the embodiment.

Furthermore, in a case where the fourth lens group G4 is adapted to be driven by moving coil type VCMs as in the embodiment, a movable portion of the fourth lens group G4 can be made light. Accordingly, the fourth lens group G4 can be driven at a higher speed.

Further, each drive unit can also be formed of an electromagnetic actuator (an actuator that includes a magnet and a coil as main components and is driven using an electromagnetic force) other than the VCM.

<<Lens Configuration>>

The third lens group-movable holding frame 24B as the first lens frame and the fourth lens group-movable holding frame 26B as the second lens frame are adapted to be moved by zooming in the embodiment, but the invention can also be applied to a lens barrel where the first lens frame and the second lens frame are not moved by zooming. Further, the invention can also be applied to a lens barrel where any one lens frame of the first lens frame or the second lens frame is moved by zooming.

In a case where at least one of the first lens frame or the second lens frame is moved by zooming, the first main shaft and the second main shaft do not necessarily need to be disposed so as to overlap each other over the entire zoom range. In a state where the first lens frame and the second lens frame are closest to each other, at least parts of the first main shaft and the second main shaft may overlap each other.

Further, a case where the invention is applied to a lens barrel of which field curvature is corrected by the movement of the third lens group-movable holding frame 24B as the first lens frame and a focus is adjusted by the movement of the fourth lens group-movable holding frame 26B as the second lens frame has been described in the embodiment by way of example, but the purpose of the movement of each lens frame is not limited thereto. For example, the invention can also be applied to a case where the first lens frame and the second lens frame are individually moved to adjust a focus (so-called floating focus).

Other Modification Examples

A case where the invention is applied to the interchangeable lens has been described in the embodiment by way of example, but the invention can also be applied to a lens barrel built in an optical device. For example, the invention can also be applied to a lens barrel of a lens-integrated camera. Further, the invention can also be applied to optical devices (for example, a projector, a microscope, a telescope, and the like) other than a camera. Furthermore, with regard to a camera, the invention can also be applied to a video camera, a television camera, a cinema camera, and the like in addition to still cameras, such as a digital camera and a silver-salt camera.

EXPLANATION OF REFERENCES

1: interchangeable lens
2: exterior body
3: focus ring
4: zoom ring
5: stop ring
10: lens barrel body
12: stationary barrel
12A: first lens group-driving straight movement groove
12B: second lens group-driving straight movement groove
12C: third lens group-driving straight movement groove
12D: fourth lens group-driving straight movement groove
14: cam barrel
14A: first lens group-driving cam groove
14B: second lens group-driving cam groove
14C: third lens group-driving cam groove
14D: fourth lens group-driving cam groove
16: mount
16A: terminal
20: first lens group-holding frame
22: second lens group-holding frame
24: third lens group-holding frame
24A: third lens group base-holding frame
24B: third lens group-movable holding frame
26: fourth lens group-holding frame
26A: fourth lens group base-holding frame
26B: fourth lens group-movable holding frame
30: stop unit
32: first lens group-driving cam pin
34: second lens group-driving cam pin
36: third lens group-driving cam pin
38: fourth lens group-driving cam pin
48: first main shaft
50: first sub-shaft
52: first main guide portion
52A: sliding portion of first main guide portion
54: first sub-guide portion
54A: groove portion of first sub-guide portion
56: third front lens group-drive unit
56A: drive magnet
56B: inner yoke
56C: drive coil
56D: outer yoke
58: second main shaft
60: second sub-shaft
62: second main guide portion
62A: sliding portion of second main guide portion 64: second sub-guide portion
64A: groove portion of second sub-guide portion
66: fourth lens group-drive unit
68: voice coil motor (VCM)
68A: drive coil
68B: drive magnet
68C: inner yoke
68D: outer yoke
70: coil holding portion
80: third front lens group-position detection unit
82: position detection magnet
84: position detection sensor
90: fourth lens group-position detection unit
92: reference position detection unit
92A: light blocking plate
92B: photo interrupter
94: displacement detection unit
94A: magnetic scale
94B: MR sensor
110: lens controller
112: stop drive unit
114: temperature detection unit
116: focus operation detection unit
118: zoom setting detection unit
120: stop setting detection unit
130: camera controller
AL1: movement locus of first lens group
AL2: movement locus of second lens group
AL3: movement locus of third lens group
AL4: movement locus of fourth lens group
G1: first lens group
G2: second lens group
G3: third lens group
G3a: third front lens group
G3b: third rear lens group
G4: fourth lens group
G5: fifth lens group
L: straight line passing through optical axis in cross section orthogonal to optical axis
Sim: image plane
St: stop
Z: optical axis

What is claimed is:

1. A lens barrel comprising:
a first main shaft and a first sub-shaft that are disposed in parallel to each other with an optical axis interposed therebetween;
a second main shaft and a second sub-shaft that are disposed in parallel to each other with the optical axis interposed therebetween;
a first lens frame that includes a first main guide portion sliding along the first main shaft and a first sub-guide portion sliding along the first sub-shaft;
a second lens frame that includes a second main guide portion sliding along the second main shaft and a second sub-guide portion sliding along the second sub-shaft;
a first drive unit that includes a plurality of first drive magnets and drives the first lens frame;
a second drive unit that includes a plurality of second drive magnets and drives the second lens frame;
a first position detection unit that detects a position of a first position detection magnet provided on the first lens frame to detect a position of the first lens frame; and
a second position detection unit that detects a position of a second position detection magnet provided on the second lens frame to detect a position of the second lens frame,
wherein the first main shaft and the first sub-shaft are disposed on a straight line passing through the second main shaft and the second sub-shaft and are disposed on a radially inner side than the second main shaft and the second sub-shaft in a cross section orthogonal to the optical axis,
the first main shaft and the second main shaft are disposed so that at least parts of the first main shaft and the second main shaft overlap each other in a direction of the optical axis,
the first position detection unit and the second position detection unit are disposed on the straight line passing through the second main shaft and the second sub-shaft in the cross section orthogonal to the optical axis, and
the plurality of first drive magnets and the plurality of second drive magnets are arranged symmetrically with respect to the straight line passing through the second main shaft and the second sub-shaft in the cross section orthogonal to the optical axis.

2. The lens barrel according to claim 1,
wherein the first position detection magnet is provided close to the first sub-guide portion, and
the second position detection magnet is provided close to the second main guide portion.

3. The lens barrel according to claim 2,
wherein the second position detection magnet is provided on the second main guide portion.

4. The lens barrel according to claim 1,
wherein a movement stroke of the first lens frame is shorter than a movement stroke of the second lens frame.

5. The lens barrel according to claim 4,
wherein the first position detection unit is formed of a hall element, and
the second position detection unit is formed of a magneto resistive sensor.

6. The lens barrel according to claim 1,
wherein a weight of the first lens frame in a state where a lens is held is smaller than a weight of the second lens frame in a state where a lens is held.

7. The lens barrel according to claim 6,
wherein a length of the first main shaft is shorter than a length of the second main shaft.

8. The lens barrel according to claim 1,
wherein the first drive unit is formed of a moving magnet type voice coil motor.

9. The lens barrel according to claim 1,
wherein the second drive unit is formed of a moving coil type voice coil motor.

10. The lens barrel according to claim 1, further comprising:
a first barrel that includes the first main shaft and the first sub-shaft, and holds the first lens frame;
a second barrel that includes the second main shaft and the second sub-shaft, and holds the second lens frame; and
a drive unit that moves at least one of the first barrel or the second barrel along the optical axis.

11. The lens barrel according to claim 10,
wherein the drive unit includes
a stationary barrel that includes a first straight movement groove and a second straight movement groove, a cam barrel that includes a first cam groove and a second cam groove, and is fitted to the stationary barrel,
a first cam pin that is provided on the first barrel, and is fitted to the first straight movement groove and the first cam groove, and
a second cam pin that is provided on the second barrel, and is fitted to the second straight movement groove and the second cam groove, and
the drive unit moves the first barrel and the second barrel along the optical axis by rotating the cam barrel relative to the stationary barrel.

* * * * *